United States Patent
Yamada et al.

(10) Patent No.: US 7,724,688 B2
(45) Date of Patent: May 25, 2010

(54) COMMUNICATION EQUIPMENT

(75) Inventors: Mariko Yamada, Tokyo (JP); Koh Ohnishi, Yokohama (JP); Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 471 days.

(21) Appl. No.: 11/704,312

(22) Filed: Feb. 9, 2007

(65) Prior Publication Data

US 2007/0237159 A1    Oct. 11, 2007

(30) Foreign Application Priority Data

Apr. 10, 2006    (JP) .............................. 2006-107066

(51) Int. Cl.
*H04L 12/28* (2006.01)
(52) U.S. Cl. .................. 370/256; 370/395.52; 370/397
(58) Field of Classification Search ........................ None
See application file for complete search history.

(56) References Cited

U.S. PATENT DOCUMENTS

| | | | | |
|---|---|---|---|---|
| 6,636,516 | B1 * | 10/2003 | Yamano ................ | 370/395.52 |
| 7,085,827 | B2 * | 8/2006 | Ishizaki et al. ............. | 709/219 |
| 2002/0002687 | A1 * | 1/2002 | Chantrain et al. ........... | 713/201 |
| 2004/0049542 | A1 * | 3/2004 | Ould-Brahim .............. | 709/203 |
| 2004/0093424 | A1 * | 5/2004 | Kojima ....................... | 709/232 |
| 2004/0151290 | A1 * | 8/2004 | Magarasevic et al. ..... | 379/93.05 |
| 2005/0157664 | A1 * | 7/2005 | Baum et al. ................. | 370/256 |
| 2005/0276232 | A1 * | 12/2005 | Ito et al. ..................... | 370/254 |

OTHER PUBLICATIONS

RFC3378, EtherIP: Tunneling Ethernet Frames in IP Datagrams, Sep. 2002.
RFC3931, Layer Two Tunneling Protocol—Version 3 (L2TPvc3), Mar. 2005.

* cited by examiner

*Primary Examiner*—Steven H Nguyen
(74) *Attorney, Agent, or Firm*—Mattingly & Malur, P.C.

(57) ABSTRACT

A user's home is connected to a plurality of service providers by a plurality of VPNs, and traffic sent and received by a home terminal is filtered to an appropriate VPN so as to avoid communication disturbance due to IP address duplication by reducing unnecessary traffic. A terminal sends terminal information to inquire a management server about a SIP URI of VPN based on the terminal information sent by the terminal as well as user information. The management server notifies a router about the SIP URI of VPN corresponding to the notified information. The router establishes the VPN based on the notified SIP URI. The router maintains a mapping between the established VPN and a source terminal of a UPnP message, and then transfers traffic sent and received by each terminal after VPN establishment.

9 Claims, 20 Drawing Sheets

MAC-VPN MAPPING TABLE

| MAC ADDRESS | SIP URI | IP ADDRESS | VPN ID |
|---|---|---|---|
| aaa | XXX@△△△ | B | 1 |
| bbb | YYY@××× | C | 2 |
| ccc | ZZZ@□□□ | D | 3 |

SIP URI TRANSLATION TABLE

| PRODUCT NAME | MAKER | SIP URI |
|---|---|---|
| AA-100 | HITACHI | XXX@△△△ |
| | | |
| | | |

USER INFORMATION TABLE

| CONTRACT USER NAME | USER A |
|---|---|

FIG. 3-4

FILTER ENTRY TABLE (217)

| ON/OFF | DIRECTION | SOURCE MAC ADDRESS | DESTINATION MAC ADDRESS | SOURCE IP ADDRESS | DESTINATION IP ADDRESS | SOURCE PORT NUMBER | DESTINATION PORT NUMBER | PROTOCOL | ACTION |
|---|---|---|---|---|---|---|---|---|---|
| ON | IN | | | | | | | | PASS |
| | | | | | | | | | |
| | | | | | | | | | |

FIG. 3-5

VPN MANAGEMENT TABLE (218)

| VPN ID | LOCAL IP ADDRESS | REMOTE IP ADDRESS | LOCAL CONTROL CONNECTION ID | LOCAL SESSION ID | REMOTE CONTROL CONNECTION ID | REMOTE SESSION ID |
|---|---|---|---|---|---|---|
| 1 | A | B | 9000 | 6000 | 1111 | 4444 |
| 2 | A | C | 8000 | 5000 | 2222 | 5555 |
| 3 | A | D | 7000 | 4000 | 3333 | 6666 |

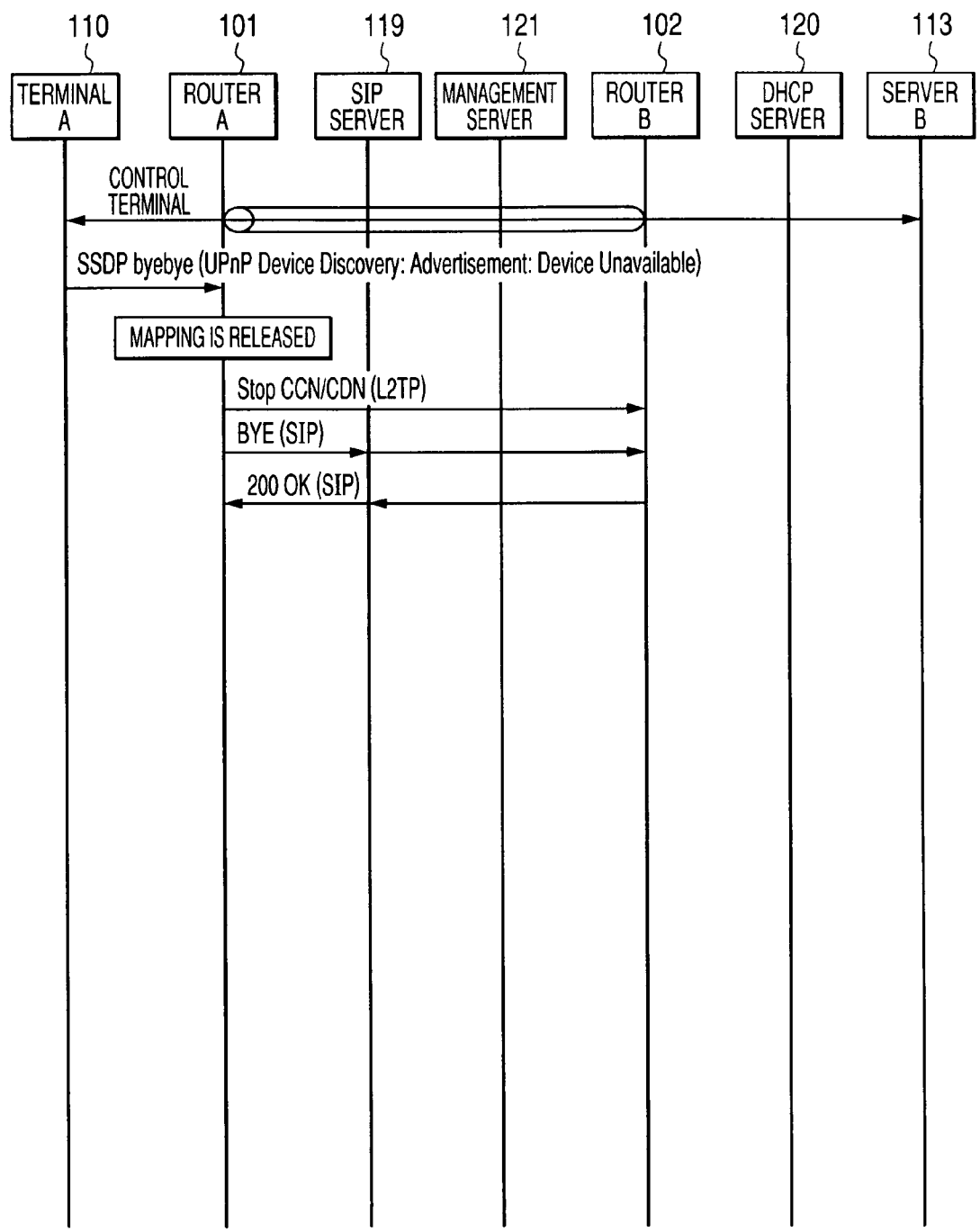

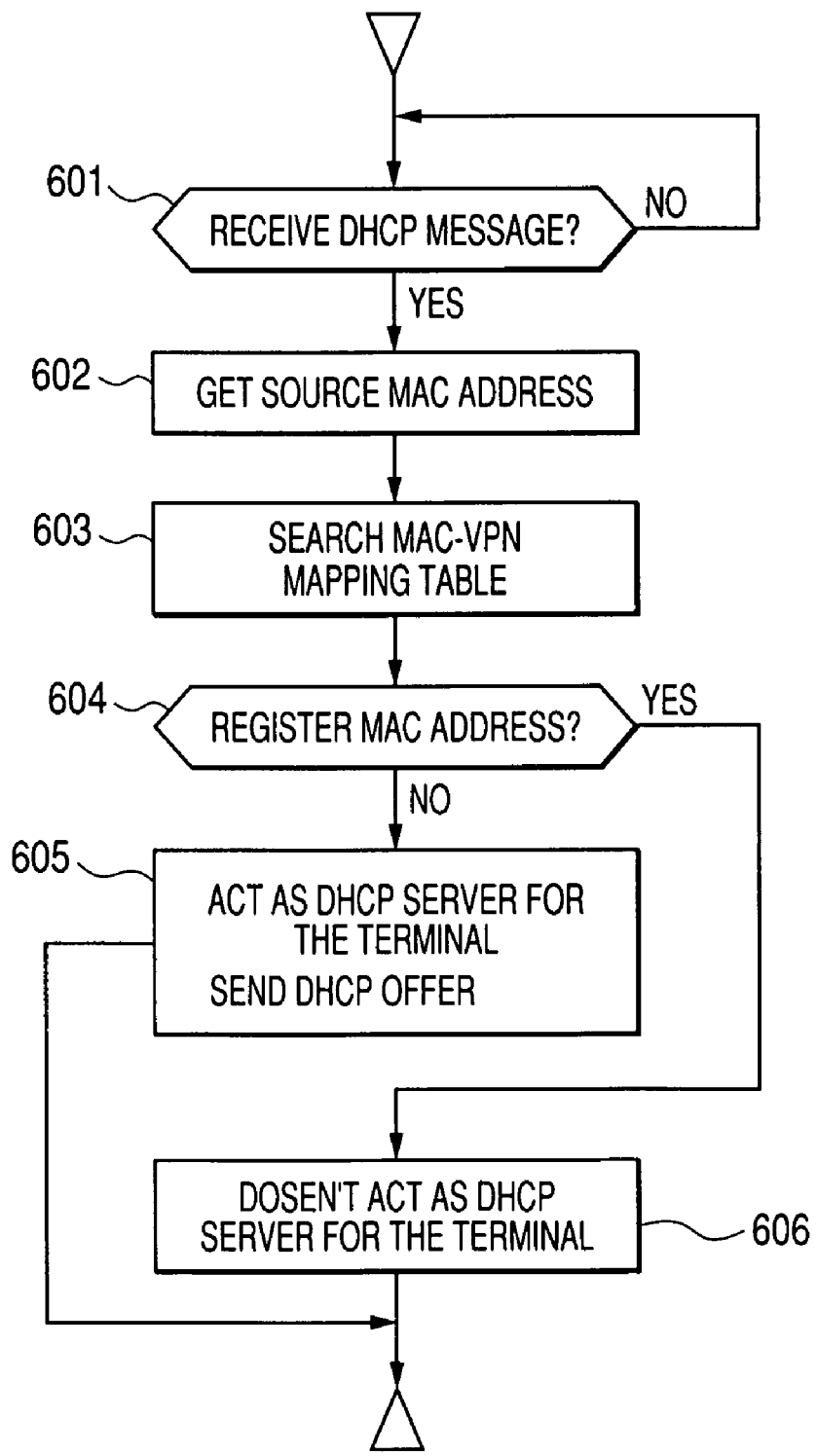

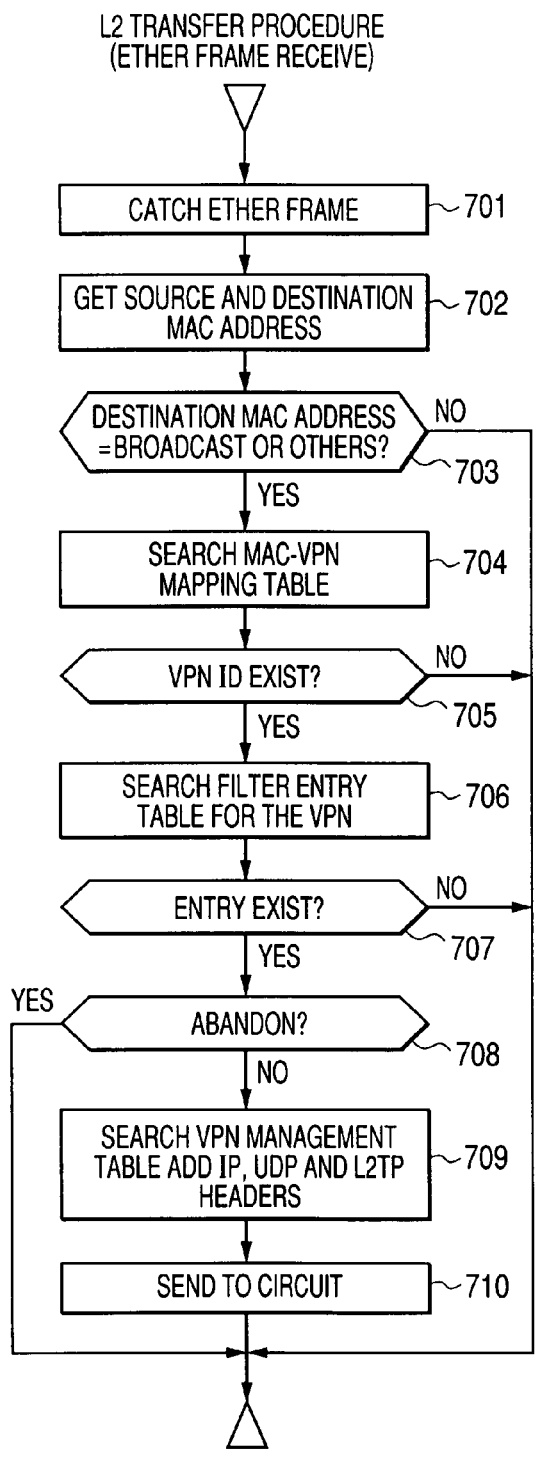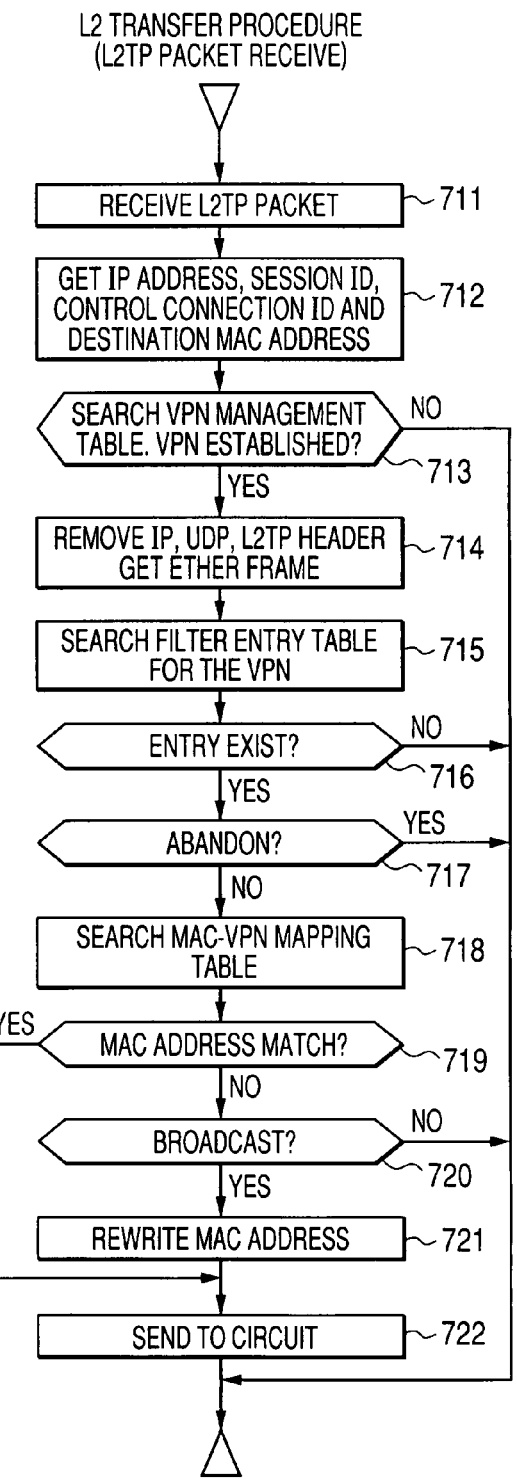

FIG. 10-1

UPnP Device Discovery: Advertisement: Device available MESSAGE EXAMPLE

1001 — NOTIFY * HTTP/1.1
HOST: 239. 255. 255. 250:1900
CACHE-CONTROL: max-age = 1800
1002 — LOCATION: http://a:12121
NT: search target
1003 — NTS: ssdp:alive
SERVER: OS/version UPnP/1.0 product/version
USN: advertisement UUID

FIG. 10-2

UPnP Device Discovery: Advertisement: Device unavailable MESSAGE EXAMPLE

1001 — NOTIFY * HTTP/1.1
HOST: 239. 255. 255. 250:1900
NT: search target
1003 — NTS: ssdp:byebye
USN: advertisement UUID

FIG. 10-3

UPnP Device Description MESSAGE EXAMPLE

1001 — HTTP/1.1 200 OK
CONTENT-TYPE: text/xml
CONTENT-Length: XXXX
<?xml version="1.0"?>
    <root xmlns="urn:schemas-upnp-org:device-1-0">
      <specVersion>
1004 —        <major>1</major>
        <minor>0</minor>
      </specVersion>
      <URLBase>base URL for all relative URLs</URLBase>

<device>
        <deviceType>urn:schemas-upnp-org:device:deviceType:v</deviceType>
        <friendlyName>short user-friendly title</friendlyName>
        <manufacturer>HITACHI</manufacturer>
1005 —        <manufacturerURL>URL to manufacturer site</manufacturerURL>
        <modelDescription>long user-friendly title</modelDescription>
        <modelName>AA-100</modelName>
        <modelNumber>model number</modelNumber>
1006 —        <modelURL>URL to model site</modelURL>
        <serialNumber>112233</serialNumber>
        <UDN>uuid:UUID</UDN>
1007 —        <UPC>Universal Product Code</UPC>
OMISSION ...

FIG. 11-1

SIP URI MANAGEMENT TABLE 1101

| CONTRACT USER NAME | PRODUCT NAME | MAKER | SERVICE PROVIDER | SIP URI |
|---|---|---|---|---|
| USER A | AA-100 | HITACHI | HOME SECURITY COMPANY | XXX@△△△ |
|  |  |  |  |  |
|  |  |  |  |  |

FIG. 11-2

SIP URI MANAGEMENT TABLE 1101

| CONTRACT USER NAME | PRODUCT NUMBER | MAKER | SERVICE PROVIDER | SIP URI |
|---|---|---|---|---|
| USER A | 112233 | HITACHI | HOME SECURITY COMPANY | XXX@△△△ |
|  |  |  |  |  |
|  |  |  |  |  |

FIG. 11-3

SIP URI CREATION RULE TABLE 1102

| INFORMATION ELEMENT 1 | INFORMATION ELEMENT 2 | INFORMATION ELEMENT 3 | SIP URI CREATION RULE |
|---|---|---|---|
| CONTRACT USER NAME | PRODUCT NAME | MAKER | ServiceVPN@CONTRACT USER NAME. PRODUCT NAME. MAKER. co. jp |

FIG. 11-4

TERMINAL INFORMATION MANAGEMENT TABLE 1104

| PRODUCT NUMBER | MAKER | MAC ADDRESS |
|---|---|---|
| 112233 | HITACHI | aaa |
|  |  |  |
|  |  |  |

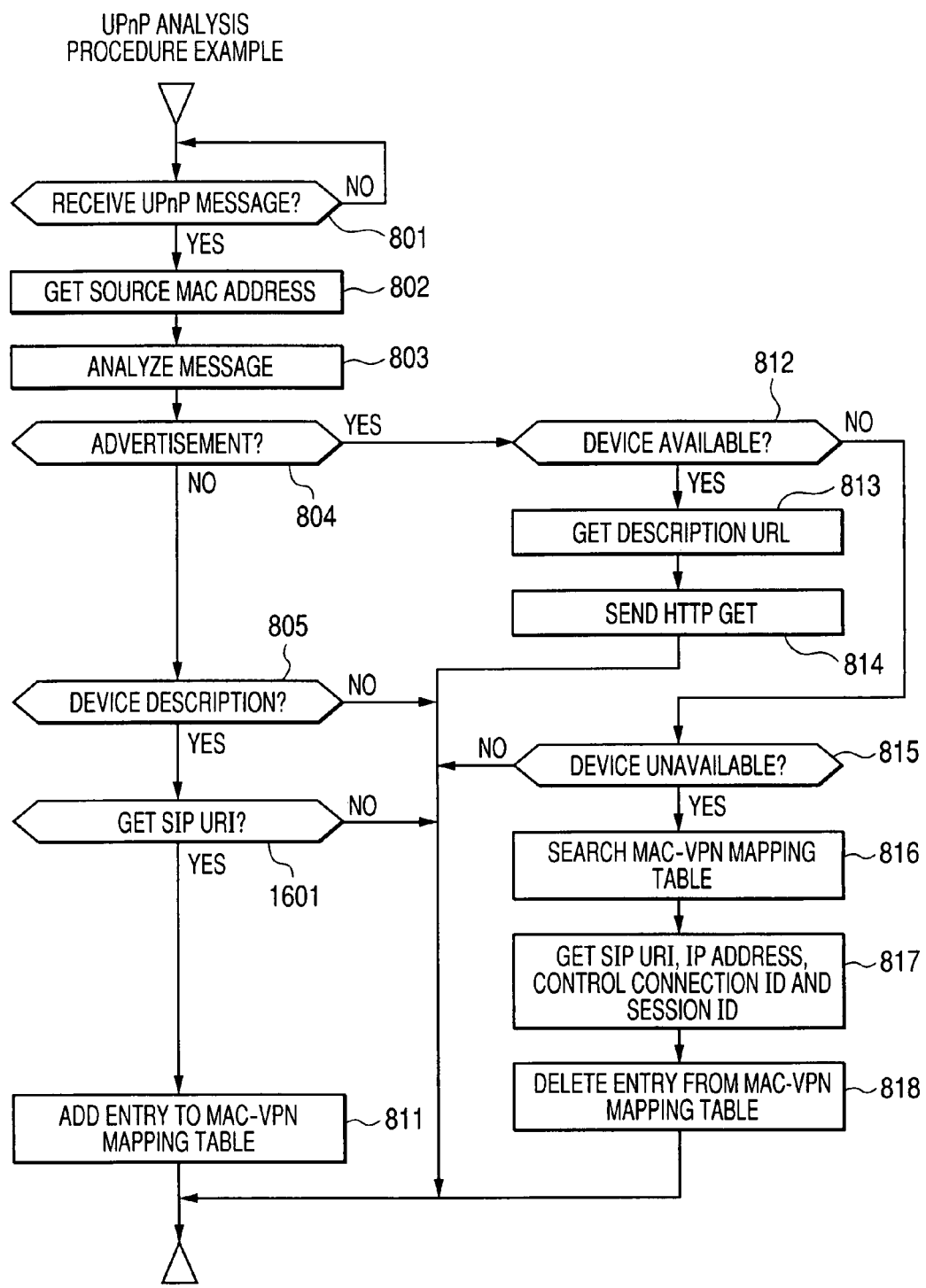

FIG. 17

UPnP Device Description MESSAGE EXAMPLE

```
1001 ── HTTP/1.1 200 OK
        CONTENT-TYPE: text/xml
        CONTENT-Length: XXXX
        <?xml version="1.0"?>
            <root xmlns="urn:schemas-upnp-org:device-1-0">
              <specVersion>
1004 ──       <major>1</major>
              <minor>0</minor>
            </specVersion>
            <URLBase>base URL for all relative URLs</URLBase>
            <ServiceVPN>serviceVPN@AA-100.HITACHI.co.jp</ServiceVPN>
1701 ──     <device>
              <deviceType>urn:schemas-upnp-org:device:deviceType:v</deviceType>
              <friendlyName>short user-friendly title</friendlyName>
              <manufacturer>HITACHI</manufacturer>
1005 ──       <manufacturerURL>URL to manufacturer site</manufacturerURL>
              <modelDescription>long user-friendly title</modelDescription>
              <modelName>AA-100</modelName>
1006 ──       <modelNumber>model number</modelNumber>
              <modelURL>URL to model site</modelURL>
              <serialNumber>112233</serialNumber>
1007 ──     <UDN>uuid:UUID</UDN>
            <UPC>Universal Product Code</UPC>
            OMISSION ···
```

COMMUNICATION EQUIPMENT

CLAIM OF PRIORITY

The present application claims priority from Japanese application JP 2006-107066 filed on Apr. 10, 2006, the content of which is hereby incorporated by reference into this application.

FIELD OF THE INVENTION

The present invention relates to a communication system that constitutes a virtual private network (VPN) between stations physically separate from each other by using Internet protocols.

BACKGROUND OF THE INVENTION

As Internet Protocol (IP) technologies for configuring an L2VPN, EtherIP (see RFC3378), and L2TPv3 (see RFC3931) are standardized by the IETF. In the case of EtherIP, VPN equipment catches an ether frame flowing on a connected LAN, encapsulates the ether frame with an EtherIP header and an IP header, and sends the ether frame to opposite VPN equipment. The VPN equipment receives an IP packet including the ether frame encapsulated with the EtherIP header and IP header, and takes out the ether frame from the received IP packet. Then the VPN equipment having received the IP packet sends the ether frame to the connected LAN. Thus an L2VPN is configured. L2TPv3 defines two logical communication channels (control channel and data channel). The control channel establishes and releases the control connection and session. The data channel transfers the ether frame by using the established session. The ether frame is transferred using an L2TP session header. The session header is encapsulated with an IP or UDP/IP header.

SUMMARY OF THE INVENTION

When local area networks (LANs) are interconnected via an L2VPN, the connectivity of a second layer (Layer 2:L2) of an OSI (Open System Interconnection) reference model can be ensured between the connected LANs, enabling communication with an arbitrary address system, without depending on the version of IP which is the higher level layer. For this reason, when a home LAN and a service provision network of a service provider are connected by the L2VPN, it is possible to provide a service to a terminal in accordance with a given operation policy of the service provider. However, when a user's home is connected to a plurality of service providers by a plurality of VPNs, unnecessary traffic would increase and the user may not receive appropriate services due to communication disturbance caused by IP address duplication. Thus when the home LAN is connected to the plurality of service provider networks by the plurality of VPNs, it is necessary to filter traffic sent and received by the home terminal into an appropriate VPN.

Further each time when a home terminal is connected to a service provider, it is necessary to set a VPN for the service provider corresponding to the terminal, to a home router. In order to connect a plurality of terminals to a plurality of service providers, it is necessary to set VPNs for the number of terminals. The connection to the appropriate service provider may be disabled when the VPN setting is incorrect. However, home users do not necessarily have good knowledge of networking. Thus the possibility of incorrect setting can be reduced with fewer settings by the home user. The present patent application solves such problems.

Upon connection to a network, a terminal sends a UPnP message to inquiry a management server about the SIP URI of VPN based on the terminal information obtained by analyzing the UPnP message and on the contract user information. The management server resolves the SIP URI of VPN to provide to the terminal based on the notified information, and then notifies a router. The router establishes the VPN based on the notified SIP URI. The router maintains a mapping between the established VPN and the source terminal of the UPnP message, and then transfers traffic sent and received by each terminal after VPN establishment, based on the above described mapping.

It is also possible that the router automatically creates the VPN SIP URI without inquiring the management server.

According to the invention, it is possible to dynamically build an appropriate VPN for a terminal in such a way that a relay router resolves or automatically creates VPN information for a service provider to provide an appropriate service to the terminal, from the terminal information sent by the terminal as well as the user information and the like. Thus there is no need for a service user to manually set a detailed VPN setting for each terminal, resulting in a reduction of user procedures. Further by establishing a MAC-VPN mapping table[W1] that maps the VPNs to the source MAC addresses of the terminal information, traffic can be filtered to the appropriate VPNs for each terminal. In this way, the service providers can provide its service to the specific home terminal in accordance with a given operation policy, regardless of the version of IP and the address system.

BRIEF DESCRIPTION OF THE DRAWINGS

FIGS. 2-1 and 2-2 are conceptual diagrams respectively showing the internal configuration (2-1) and internal procedures (2-2) of a CE router used in the invention;

FIGS. 3-1 to 3-5 are conceptual diagrams respectively showing a MAC-VPN mapping table (3-1), a SIP URI translation table (3-2), a user information table (3-3), a filter entry table (3-4), and a VPN management table (3-5);

FIG. 4 is a sequence diagram showing the manner in which the invention is carried out;

FIG. 5 is another sequence diagram showing the manner in which the invention is carried out;

FIG. 6 is a flowchart showing a DHCP procedure;

FIGS. 7-1 and 7-2 are flowcharts showing examples of an L2 transfer procedure;

FIGS. 10-1 to 10-3 are description examples of a Device available message (10-1), a Device unavailable message (10-2), and a Device Description message (10-3);

FIGS. 11-1 to 11-4 are conceptual diagrams of SIP URI management tables (11-1, 11-2), a SIP URI creation rule table (11-3), and a terminal information management table (11-4);

FIG. 16 is a flowchart showing the UPnP procedure when the terminal notifies about a SIP URI;

FIG. 17 is a description example of the Device Description message when the terminal notifies about a SIP URI;

DETAILED DESCRIPTION OF THE PREFERRED EMBODIMENTS

First Embodiment

Figure 1:
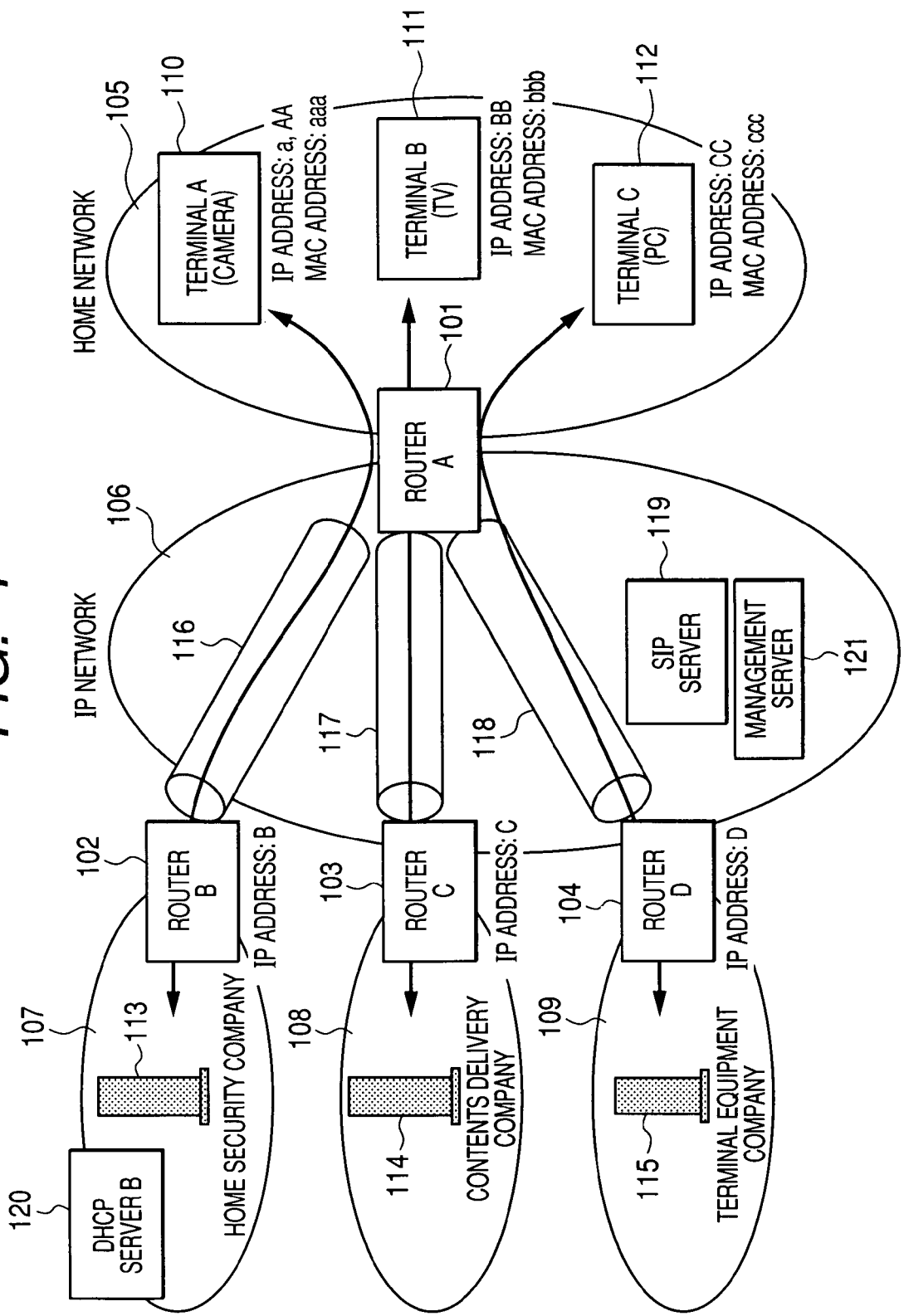
FIG. 1 is a conceptual diagram showing a communication system in which the invention is carried out.

FIG. 1 shows a communication system in which the present invention is carried out. The communication system includes: routers A101, B102, C103, D104; a home network 105 to which the router A belongs; an IP network 106; networks (107, 108, 109) of service providers to which the routers B to D respectively belong; terminals A110, B111, C112 belonging to the home network; servers (113, 114, 115) of the service provides; a SIP server 119; a DHCP server 120 of a service provider B; and a management server 121. The routers A and B are connected by a VPN 116, the routers A and C are connected by a VPN 117, and the routers A and D are connected by a VPN 118.

Figures 1, 2:
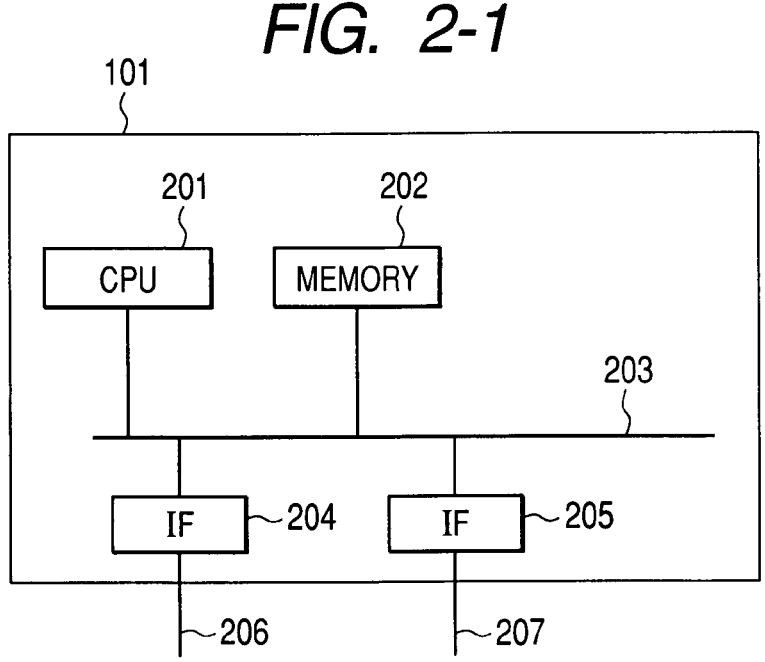
Figure 2:
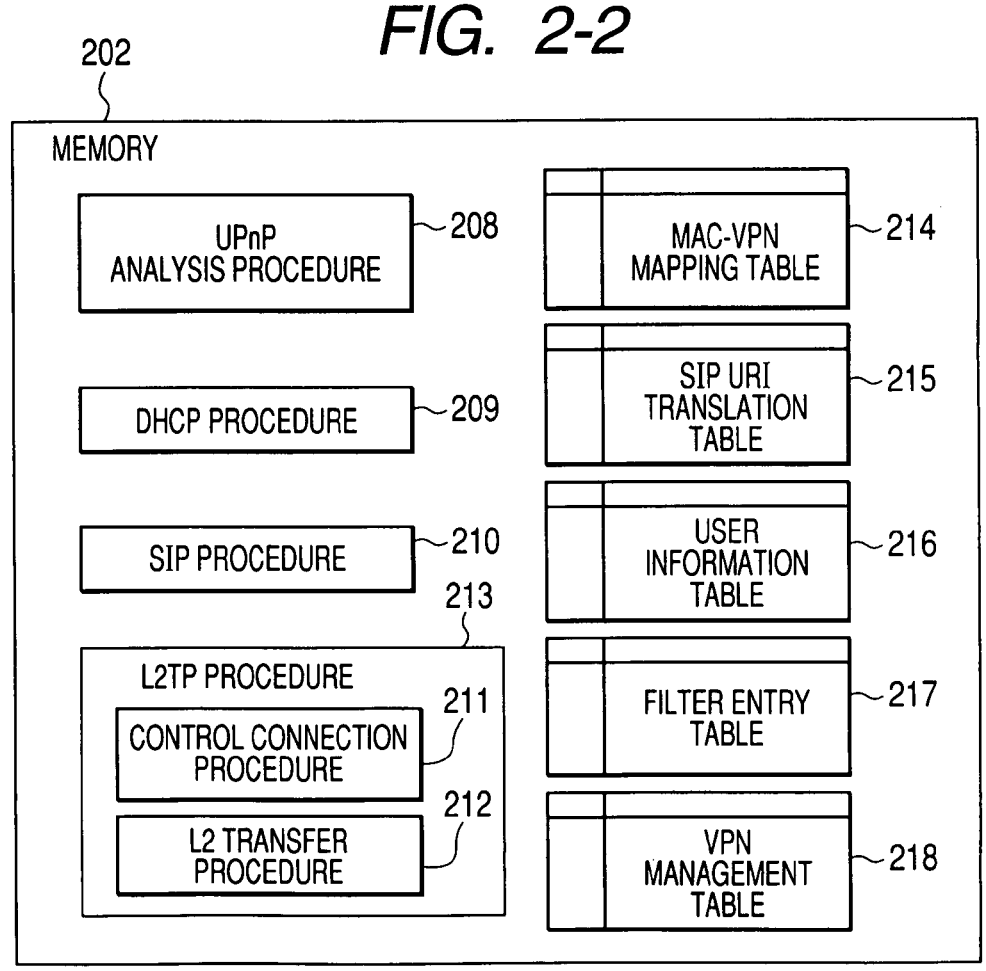

FIG. 2-1 is a configuration example of a router. The router A101 includes a CPU (Central Processing Unit) 201, a memory 202, and interface parts 204, 205. The CPU 201 actually executes various application programs and OS (Operating System). The memory 202 stores the various application programs and programs used in the execution of the CPU 201. The CPU 201 and the memory 202 are connected via a bus 203. The interface parts 204, 205 provide data from the CPU 201 and memory 202 to external equipment while receiving data from the external equipment. The interface parts 204, 205 are respectively connected to lines (206, 207), one of which is a line connected to the home network 105 and the other is a line connected to the IP network 106.

FIG. 2-2 shows the information stored in the memory 202. There are tables such as a MAC-VPN mapping table 214, a SIP URI translation table 215, a user information table 216, a filter entry table 217, and a VPN management table 218. Also stored in the memory 202 are programs such as a UPnP (Universal Plug and Play) analysis procedure 208, a DHCP (Dynamic Host Configuration Protocol) procedure 209, a SIP (Session Initiation Protocol) procedure 210, and an L2TP procedure 213. The L2TP procedure 213 includes a control connection procedure 211 and an L2 transfer procedure 212.

The UPnP analysis procedure 208 analyzes a UPnP message from each of the terminals (110, 111, 112) belonging to the home network 105, and obtains or creates a SIP URI that is necessary to establish a VPN. The DHCP procedure 209 determines whether to provide a DHCP server function to the terminal depending on the presence or absence of the VPN establishment. The L2TP procedure 213 provides a VPN function using L2TP. The control connection procedure 211 establishes and releases an L2TP control connection. The L2 transfer procedure 212 transfers L2 data after establishment of the L2TP control connection. The SIP procedure 210 establishes and releases a SIP session.

The MAC-VPN mapping table 214 manages mapping relationships between MAC addresses and VPNs in order to filter traffic from terminals to appropriate VPNs. FIG. 3-1 shows a configuration example of the MAC-VPN mapping table 214. Managed information includes the MAC address of the terminal, the SIP URI of VPN for the service provider, the IP address of the service provider router, and the VPN ID of the established VPN.

The SIP URI translation table 215 manages terminal information obtained using UPnP and the SIP URI of VPN corresponding to the terminal. FIG. 3-2 shows a configuration example of the SIP URI translation table 215. Managed information includes the terminal information such as the product name and maker, as well as the SIP URI of VPN corresponding to the terminal information.

The user information table 216 manages information such as the contract user name of the user having a contract with a service provider or a platform provider. FIG. 3-3 is a configuration example of the user information table 216.

Figure 4:
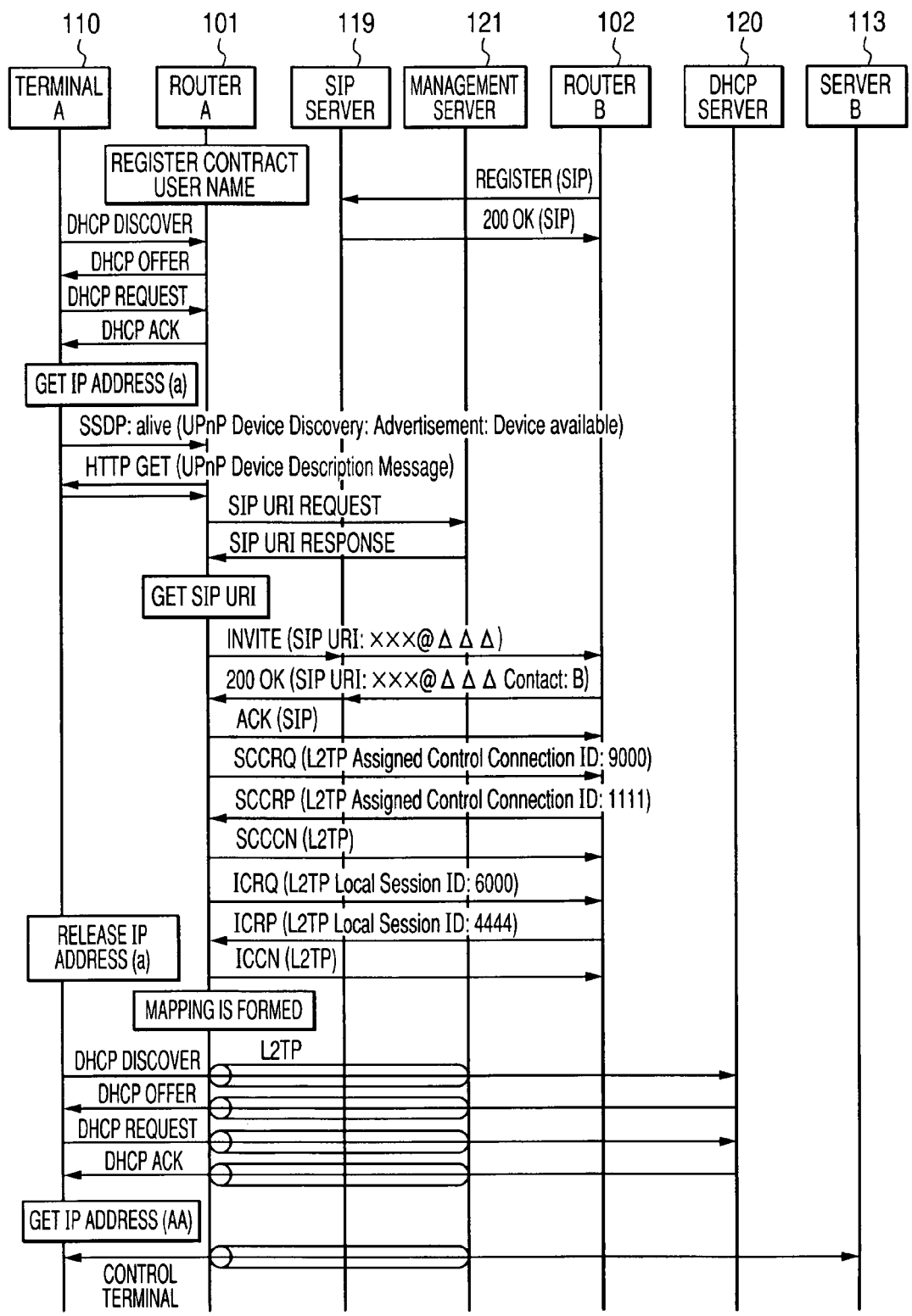

The filter entry table 217 manages the filter entry for each L2TP session so as to appropriately filter traffic within the VPN. FIG. 3-4 shows a configuration example of the filter entry table 217. Managed information includes whether to perform filtering according to the entry (ON/OFF), the packet direction (Inbound/Outbound), the source and destination MAC addresses of the ether frame, the source and destination IP addresses of the IP packet, the source and destination port numbers of the UDP/TCP packet, the protocol type, and the action (Passing or Abandonment) when the ether frame and the packet match with the above description rule.

The VPN management table 218 manages established L2TP VPNs. FIG. 3-5 shows a configuration example of the VPN management table 218. Managed information includes the VPN ID for identifying each established VPN, the local IP address which is an IP address assigned to the own interface on which the VPN is established, the remote IP address which is an IP address of the opposite router on which the VPN is established, the local control connection ID and local session ID that the own router assigned to the L2TP control connection and session IDs, and the remote control connection ID and remote session ID that the opposite router assigned to the L2TP control connection and session IDs.

The management server 121 maintains a SIP URI management table 1101 and manages the mapping relationship between the information on the terminal used by the contract user and the SIP URI for establishing the VPN for the service provider. FIG. 11-1 shows a configuration example of the SIP URI management table 1101. The SIP URI management table 1101 manages at least information on the contract user name, the product name, the maker, the service provider, and the SIP URI. The product name and the maker are the values for identifying the terminal, and as shown in FIG. 11-2, some other value such as the product number may be used together with the maker.

FIG. 4 shows the sequence in which the invention is carried out. A user of the home network 105 registers contract information such as the user name (USER A) having a contract with a service provider and a platform provider into the router A101 in advance. The registered information is managed in the user information table 216 of the router A101. The router B102 registers the SIP URI of VPN to provide a service and the IP address corresponding to the SIP URI into the SIP server 119 by using a REGISTER message.

After connection to the network, the terminal A110 within the home network 105 broadcasts a DHCP DISCOVER message to obtain the IP address. The source MAC address of the message is aaa which is the MAC address of the terminal A110. Upon receiving the DHCP DISCOVER massage, the router A101 calls the DHCP procedure 209.

FIG. 6 shows a process flow of the DHCP procedure 209. The router A101 receives the DHCP DISCOVER message (Step 601), and obtains the source MAC address aaa of the message (Step 602). The router A101 searches the MAC-VPN mapping table 214 based on the obtained MAC address aaa (Step 603), and confirms the presence of the registration of the MAC address (Step 604). When the MAC address is present and the VPN IP is registered in the MAC-VPN mapping table 214, the router A101 determines that the DHCP server is located within the network that is connected by the VPN, and ends the procedure without providing the DHCP server function to the terminal (Step 606). When the MAC address registration is not present in the MAC-VPN mapping table 214, the router A101 provides the DHCP server function to the terminal (Step 605). The router A101 sends a DHCP OFFER message to the terminal in order to notify about an available address, and ends the procedure. At this stage, the MAC address of the terminal A110 is not registered in the MAC-VPN mapping table 214, so that the router A101 provides the DHCP server function to the terminal A110. The router A101 selects an unused IP address a from an IP address pool that is managed for the home network 105, and notifies the terminal A110 about the selected IP address by using the DHCP OFFER message. Assuming that another address is delivered to the terminal A110 from the DHCP server of the service provider afterward, the effective time of the notified IP address a is set to a relatively short time.

Now returning to FIG. 4, the sequence will be further described. The terminal A110 receives the DHCP OFFER message from the router A101, and sends a DHCP REQUEST message to the router A101 in order to notify that the specified address a is used. Upon receiving the DHCP REQUEST message, the router A101 sends a DHCP ACK message as a response to the terminal A110. Thus the IP address a is assigned to the terminal A110.

The terminal A110 sends a UPnP Device Discovery message: Advertisement: Device available, using the IP address a obtained from the router A101. Advertisement: Device available is a message to notify that the own terminal is available, using the value SSDP (Simple Service Discovery Protocol): alive.

Figure 8:
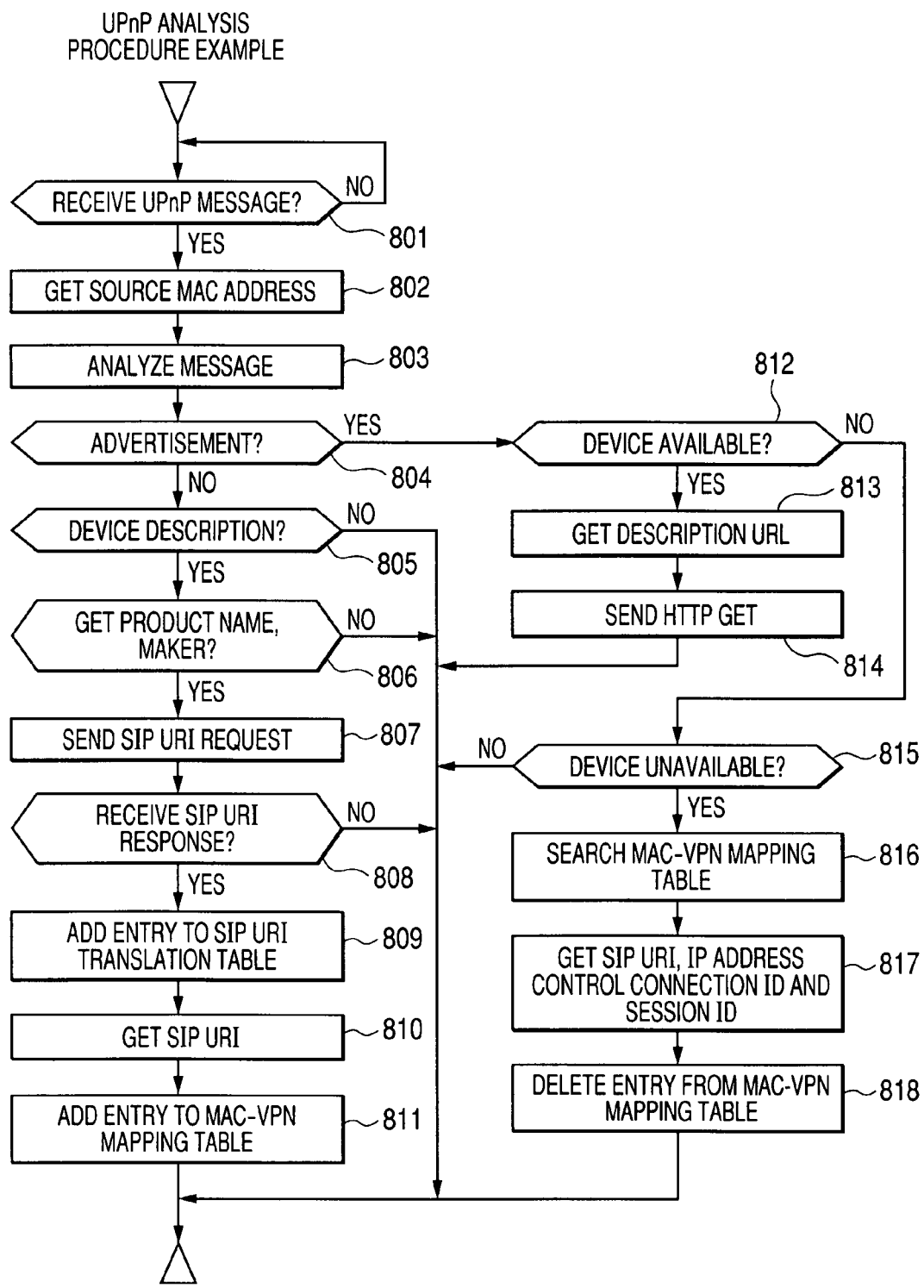
FIG. 8 is a flowchart showing a UPnP procedure.

Upon receiving the UPnP message from the terminal A110', the router A101 calls the UPnP analysis procedure 208. FIG. 8 shows a process flow of the UPnP analysis procedure 208. The router A101 receives the UPnP message (Step 801), and obtains the source MAC address of the UPnP message (Step 802). The router A101 analyzes the received message (Step 803), and determines the type of the UPnP message. First it determines whether the received message is Advertisement of the UPnP Device Discovery message (Step 804). FIGS. 10-1 and 10-2 show description examples of the Advertisement message of the UPnP Device Discovery message. The determination of whether the message is Advertisement is made by a request method 1001 of the message. When the request method is NOTIFY, it is determined as Advertisement. The procedure proceeds to Step 812 as the received message is Advertisement. In Step 812, the router A101 analyzes an NTS header 1003 of the received Advertisement message, and determines whether it is "Device available" notifying that the terminal is available (Step 812). When the NTS header 1003 is ssdp:alive, it is determined as Device available. The procedure proceeds to Step 813 as the received message is Device available. In Step 813, the router A101 obtains Description URL (http://a:12121) of the terminal A110 from a LOCATION header. Description URL is the URL showing the description location of the detailed information on the terminal. The router A101 sends a GET request of HTTP (Hyper Text Transfer Protocol) to the URL (http://a:12121) obtained in Step 813 (Step 814), and ends the procedure.

Now returning to FIG. 4, the sequence will be further described. The terminal A110 receives the HTTP GET request, and then sends a UPnP Device Description message to the router A101, together with a response code of 200 OK. Upon receiving the UPnP message, the router A101 calls the UPnP analysis procedure 208. The procedure proceeds from Step 801 to Step 804 to analyze the received message. FIG. 10-3 shows a description example of the UPnP Device Description message. The procedure proceeds to Step 805 as the message is not Advertisement. In Step 805, it analyzes the XML syntax to determine whether the received message is the UPnP Device Description message. When the value of a root header 1004 is <root xmlns="urn:schemas-upnp-org:device-1-0">, it is determined as the UPnP Device Description message, and thus the procedure proceeds to Step 806. The procedure ends if the received message is not the UPnP Device Description. In Step 806, the router A101 obtains the maker (HITACHI) and product name (AA-100) of the terminal A110 from a manufacture header 1005 and modelName header 1006 included in the UPnP Device Description. The manufacture header 1005 and the modelName header 1006 are the information necessary to the UPnP Device Description message, so that the procedure ends if there is no description. In Step 807, the router A101 notifies the management server 121 about the product name and maker of the terminal A110, which were obtained in Step 806 as well as the contract user name registered in the user information table 216, as the SIP URI request message to request the SIP URI of the VPN service corresponding to the terminal A110.

Upon receiving the SIP URI request, the management server 121 obtains the contract user name, product name, and maker that are included in the received SIP URI request, and then searches the SIP URI management table 1101 to obtain the corresponding SIP URI. The management server 121 sends the obtained SIP URI as well as the product name and maker notified by the SIP URI request message, as the SIP URI response to the router A101.

In the case where the management server 121 identifies the terminal by the product number, the router A101 obtains a product number (112233) of the terminal from a Serial Number header 1007 in Step 806. In Step 807, the router A101 notifies the management server 121 about the terminal product number (112233) obtained in Step 806 and the contract user name registered in the user information table 216, as the SIP URI request message to request the SIP URI of the VPN service corresponding to the terminal A110. The router A101 uses the product number for the other procedures in place of the product name.

Now returning to FIG. 8, the UPnP analysis procedure flow 208 will be further described. After sending the SIP URI request (Step 807), the UPnP analysis procedure 208 waits until receiving the SIP URI response. The procedure ends after waiting for a predetermined period of time with no SIP URI response received. When receiving the SIP URI response (Step 808), the router A101 sets the product name, maker, and SIP URI that were obtained from the SIP URI response into the SIP URI translation table 215. Then the router A101 obtains the SIP URI (xxx@ΔΔΔ) corresponding to the terminal A110 from the set SIP URI translation table 215 (Step 810). The router A101 sets the MAC address aaa obtained in Step 802 and the SIP URI obtained in Step 810 into the MAC-VPN mapping table 214 (Step 811), and ends the procedure.

Now returning to FIG. 4, the sequence will be further described. After obtaining the SIP URI in the UPnP analysis procedure 208, the router A101 continues to process the SIP procedure 210. In the SIP procedure 210, the router A10 sends a session start request (INVITE message) to the SIP server 119 by using the SIP URI obtained in the UPnP analysis procedure 208. Upon receiving the INVITE message, the SIP server 119 analyzes the SIP URI, and transfers the INVITE message to the router B102 as the appropriate destination. Upon receiving the INVITE message and if responding to the session start request, the router B102 sends the 200 OK message to the SIP server 119. The SIP server 119 transfers the message to the router A101. Upon receiving the 200 OK message, the router A101 searches the header field and obtains the SIP URI (xxx@ΔΔΔ) included in a To header as well as an IP address (B) included in a Contract header. Further the router A101 searches the MAC-VPN mapping table 214 and records the IP address B obtained from the Contract field into an entry having the corresponding SIP URI. Then the router A101 directly sends an ACK message to the router B102. Thus the SIP session is established between the routers A101 and B102 by the above described sequence.

After establishment of the SIP session, the router A101 continues to process the control connection procedure 211 of the L2TP procedure 213. More specifically, the control connection procedure 211 starts the establishment of an L2TP control connection for the IP address B of the opposite router obtained in the SIP procedure 210. The router A101 searches the MAC-VPN mapping table 214 and obtains the IP address B of the router B102. The router A101 creates an SCCRQ (Start Control Connection Request) message with the obtained IP address B as the IP packet destination, and sends the message to the router B102. The SCCRQ message includes a control connection ID 9000 that the router A101 has assigned. The control connection ID assigned by the router A101 is notified using Assigned Control Connection ID AVP. The router A101 registers 9000, which is the notified control connection ID, as the local control connection ID into the VPN management table 218. The router B102 sends a SCCRP (Start Control Connection Reply) message as a response to the SCCRQ to the router A101. The SCCRP message includes a control connection ID 1111 that the router B102 has assigned. The control connection ID assigned by the router B102 is notified using Assigned Control Connection ID AVP. Upon receiving the SCCRP message, the router A101 obtains the control connection ID (1111) assigned by the router B from the message, and records it as the remote control connection ID into the VPN management table 218. Then the router A101 sends an SCCCN (Start Control Connection Connected) message to the router B. Thus the L2TP control connection is established between the routers A101 and B102 by the above described sequence. Further the L2TP session is established by exchange of ICRQ (Incoming call Request), ICRP (Incoming call Reply), and ICCN (Incoming call Connected) messages between the routers A101 and B102. The ICRQ message includes a session ID 6000 that the router A101 has assigned. The ICRP message includes a session ID 4444 that the router B102 has assigned. In the VPN management table 218 of the router A101, there are registered the session ID 6000 assigned by the router A101 as the local session ID, and the session ID 4444 assigned by the router B102 as the remote session ID. The session IDs assigned by the respective routers (A101, B102) are notified using Local Session ID AVP.

After establishment of the control connection and the session, the router A101 registers VPN ID 1 for identifying the VPN into the corresponding row of the VPN management table 218. Then the router A101 registers the same VPN ID (VPN ID 1) as the VPN ID registered in the VPN management table 218 into the MAC-VPN mapping table 214 that the router A101 searched before starting the establishment of the control connection.

By the above described UPnP analysis procedure 208, SIP procedure 210, and control connection procedure 211, an entry of the MAC-VPN mapping table 214 is formed with which the mapping relationship of the MAC address and the VPN can be managed. Subsequently, the router A101 searches the above table to process the L2 transfer procedure 212.

When the effective time of the IP address a assigned by the DHCP server of the router A101 is expired, the terminal A110 releases the IP address a, and broadcasts the DHCP DISCOVER message. Upon receiving the DHCP DISCOVER message, the router A101 calls the DHCP procedure 209. The DHCP procedure 209 proceeds from Step 601 to Step 604 in accordance with the flow shown in FIG. 6-2. As the MAC address aaa of the terminal A110 has been registered in the MAC-VPN mapping table 214 in Step 811 of the UPnP analysis procedure 208, the router A101 does not act as the DHCP server for the terminal A110 (Step 606), and ends the procedure.

On the other hand, as the DHCP DISCOVER message is broadcasted, the massage is also received in the L2 transfer procedure 212 of the L2TP procedure 213.

Figure 9:
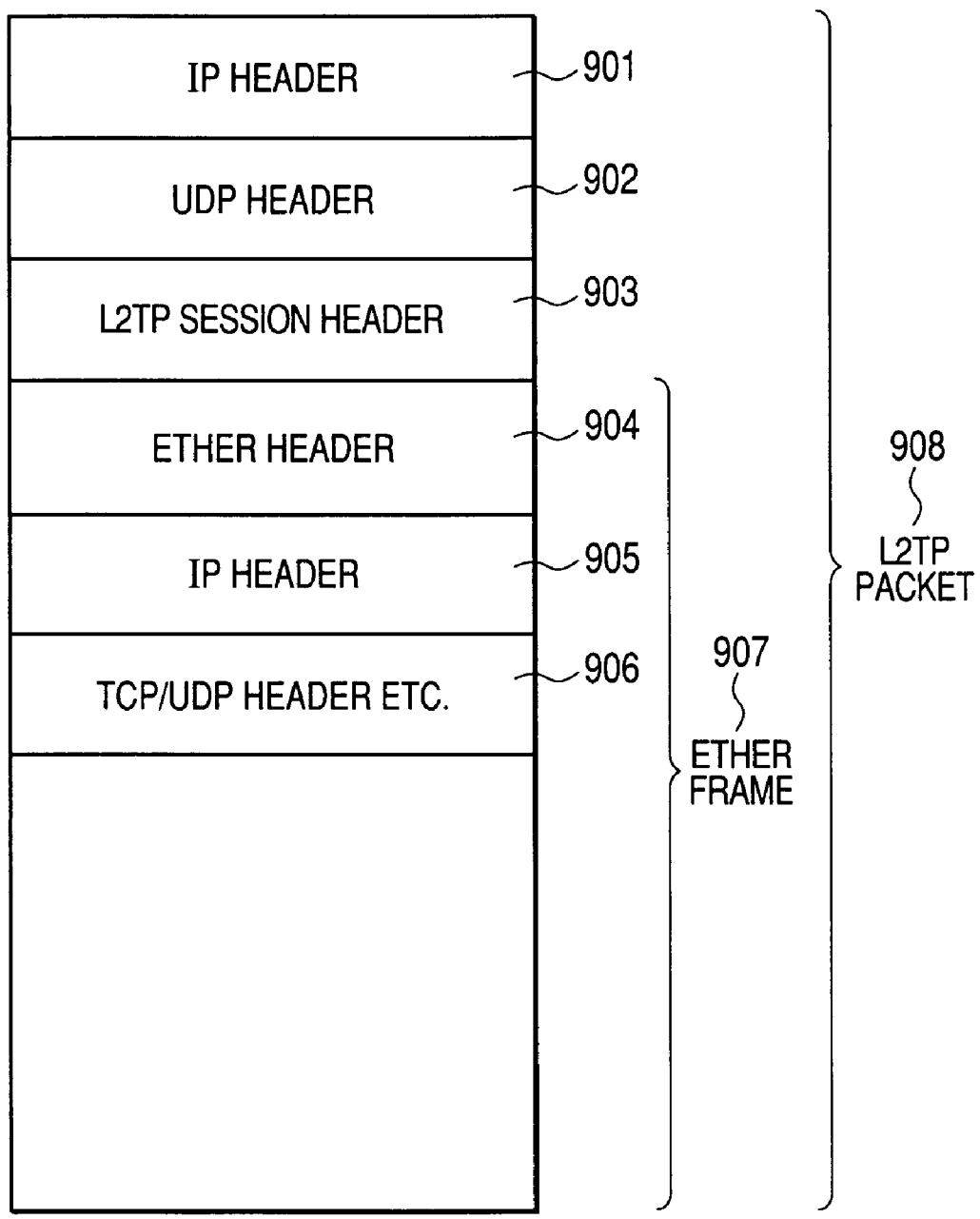
FIG. 9 is a conceptual diagram of a packet that is processed in the L2 transfer procedure.

FIG. 7-1 shows a process flow of the L2 transfer procedure 212 for the case of receiving an ether frame. FIG. 9 is a configuration diagram of a packet used in the L2 transfer procedure 212. The router A101 catches an ether frame 907 from the interface on the LAN side (Step 701), and then obtains the source and destination MAC addresses of the ether frame 907 (Step 702). In this case, the destination MAC address of the DHCP DICOVER message is a broadcast address. The router A101 determines whether the obtained destination MAC address is addressed to broadcast or others (Step 703). The procedure ends if it is not addressed to broadcast or others. As the destination MAC address of the ether frame is a broadcast address, the procedure proceeds to Step 704. In Step 704, the router A101 searches the MAC-VPN mapping table 214. It determines whether the registration of the source MAC address of the ether frame is present and the corresponding VPN ID is registered in the MAC-VPN mapping table 214 (Step 705). The procedure ends if the registration is not present. When the registration is present, the router A101 searches the filter entry table 217 for the VPN ID to determine whether the ether frame 907 caught in Step 701 corresponds to the entry (Step 707). The source and destination MAC addresses of the filter entry table 217 are determined by comparing with an Ether header 904. The source and destination IP addresses are determined by comparing with a TCP/UDP header 906. The protocol is determined from the protocol number (for IPv4) or next header (for IPv6) field of an IP header 905, or from the type field of an Ether header 904.

Here the procedure ends if the ether frame 907 does not correspond to the entry. When the ether frame 907 corresponds to the entry, the router A101 searches the action of the entry to determine whether the action is Abandonment or Passing (Step 708). The procedure ends if the action is Abandonment. When the action is Passing, the router A101 searches the VPN management table 218 from the VPN ID obtained in Step 705, and obtains the remote IP address and the remote session ID. Then the router A101 adds an IP header 901, a UDP header 902, and an L2TP session header 903 to the ether frame 907 caught in Step 701 (Step 709), and outputs an L2TP packet 908 to the line on the WAN side.

By the above described procedure, the ether frame 907 sent by the terminal within the home network is transferred to the network of the appropriate service provider for the terminal. Thus the DHCP DISCOVER message from the terminal A110 is transferred to the network 107 of the service provider B by using an L2TP tunnel built between the routers A101 and B102. A DHCP server B120 located within the network 107 of the service provider B receives the DHCP DICOVER message from the terminal A110, and then sends the DHCP OFFER message to the terminal A110 in order to notify about an IP address A that the terminal A110 can use. The router B102 catches the DHCP OFFER message, creates an L2TP packet 908 including the message, and then transfers the message to the router A101.

FIG. 7-2 shows a process flow of the L2 transfer procedure 212 for the case of receiving the L2TP packet. The router A101 receives the L2TP packet 908 from the interface on the WAN side (Step 711), and obtains the source IP address, the L2TP session ID, and the destination MAC address of the ether frame tunneled by the L2TP, respectively from the IP header 901, the L2TP session header 903, and the ether frame 904 (Step 712). The router A101 searches the VPN management table 218 to determine whether the source IP address and L2TP session ID obtained in Step 712 match with the remote IP address and local session ID of the established L2TP VPN (Step 713). The procedure ends if they do not match each other. When they match each other, the router A101 obtains the VPN ID from the VPN management table 218 while eliminating the IP header 901, the UDP header 902, and the L2TP session header 903 from the received L2TP packet 908 to obtain the ether frame 907 (Step 714). The router A101 searches the filter entry table 217 for the obtained ether frame 907 (Step 715), and determines whether the ether frame 907 obtained in Step 714 corresponds to the entry (Step 716). In the filter entry table 217, the determination is made in the same manner as the case of receiving the ether frame. That is, the source and destination MAC addresses of the filter entry table 217 are determined by comparing with the Ether header 904. The source and destination IP addresses are determined by comparing with the IP header 905. The source and destination ports are determined by comparing with the TCP/UDP header 906. The protocol is determined from the protocol number (for IPv4) or next header (for IPv6) field of the IP header 905, or from the type field of the Ether header 904. The procedure ends if the ether frame does not correspond to the entry. When the ether frame corresponds to the entry, the router A101 searches the action of the entry, and determines whether the action is Abandonment or Passing (Step 717). The procedure ends if the action is Abandonment. When the action is Transfer, the router A101 searches the MAC-VPN mapping table 214 (Step 718). Then the router A101 determines whether the MAC address of the MAC-VPN mapping table entry corresponding to the VPN ID obtained in Step 713 and the destination MAC address of the ether frame 907 match each other (Step 719). When the MAC addresses match each other, the router A101 outputs the ether frame 907 obtained from the L2TP packet 908 to the line on the LAN side (Step 722). When the MAC addresses do not match each other, the router A101 determines whether the destination MAC address of the ether frame 907 is broadcast (Step 720). The procedure ends if the destination MAC address is not broadcast. When the destination MAC address is broadcast, the router A101 rewrites the destination MAC address of the ether frame 907 into the MAC address registered in the corresponding entry of the MAC-VPN mapping table (Step 721), and then outputs the ether frame 907 to the line on the LAN side (Step 722).

By the above described procedure, the ether frame 907 sent by the server of the service provider is transferred to the appropriate terminal. Thus the DHCP OFFER message from the DHCP server B120 is transferred to the terminal A110.

The terminal A110 receives the DHCP OFFER message, and sends the DHCP REQUEST message to the DHCP server B120 in order to notify that the specified address A is used. Upon receiving the DHCP REQUEST message, the DHCP server B120 sends the DHCP ACK message as a replay to the terminal A110. In this way, an IP address AA is assigned to the terminal A110 in accordance with the operation policy of the service provider B. The L2 connectivity is ensured between the terminal A110 and the network 107 of the service provider B, so that any IP address can be assigned regardless of the version of IP (IPv4, IPv6). In addition, it is possible to perform two-way communications with an IPv4 private address or an IPv6 link local address.

In the same manner as in the case of the terminal A, VPNs are built between the terminal B111 and the network 108 of the service provider C, and between the terminal C and the network 109 of the service provider D.

More specifically, similarly to the terminal A, a VPN 117 is built between the router A101 and the router C103 in order to connect the terminal B111 and the network 108 of the service provider C, and a VPN 118 is built between the router A101 and the router D104 in order to connect the terminal C112 and the network 109 of the service provider D. The information on the VPN 117 registered in the VPN management table 218 of the router A101 is as follows: 8000 for the local control connection ID; 5000 for the local session ID; 2222 for the remote control connection ID; 5555 for the remote session ID; and 2 for the VPN ID. The IP address assigned by the service provider C to the terminal B111 is BB, the MAC address of the terminal B111 is bbb, and the IP address of the router C is C. The information on the VPN 118 registered in the VPN management table 218 of the router A101 is as follows: 7000 for the local control connection ID; 4000 for the local session ID; 3333 for the remote control connection ID; 6666 for the remote session ID; and 3 for the VPN IP. The IP address assigned by the service provider D to the terminal C112 is CC, the MAC address of the terminal C112 is ccc, and the IP address of the router D is D.

The router A101 can filter terminal traffic to the appropriate VPNs for each of the terminals (110, 111, 112) by searching the MAC-VPN mapping table 214 created by the above described procedure.

Figure 12:
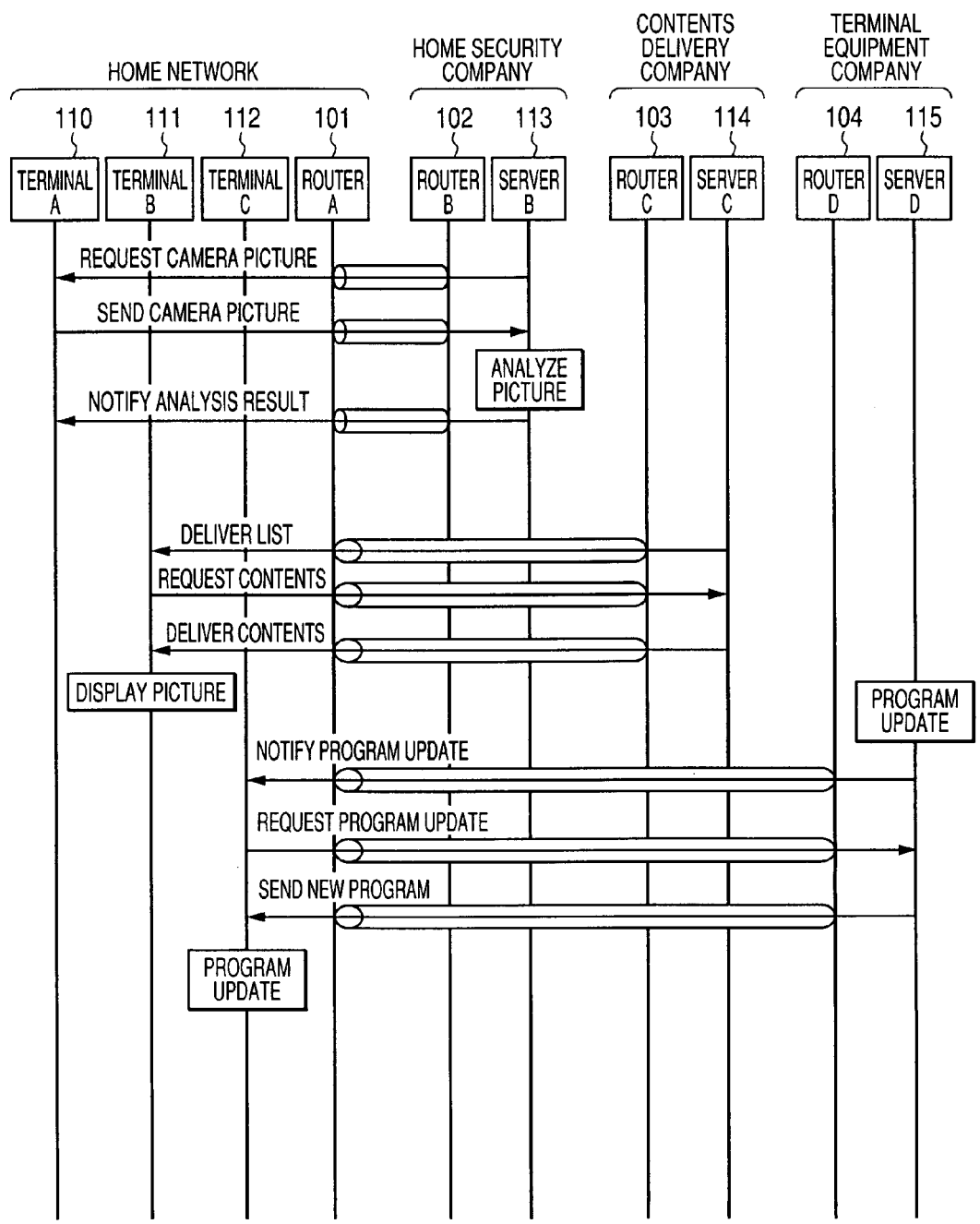
FIG. 12 is an example of a terminal control sequence.

FIG. 12 shows an example of the control sequence after establishment of the VPNs. It is assumed that a home security company has the service provider network B107, a contents delivery company has the service provider network C108, and a terminal equipment company has the service provider network D109. The home security company provides a monitoring service that notifies the user about suspicious persons or incidents through the analysis of the camera picture of the user's home. The contents delivery company provides a contents delivery service to TV, STB (Set Top Box) or other device in the user's home. The terminal equipment company provides a program update service of the product sold by the company.

After establishment of the VPNs and the delivery of the IP addresses, the server B113 of the home security company notifies a camera (terminal A110) in the user's home about a contents transmission request. The destination IP address of the contents transmission request used herein is a unicast address AA assigned by the DHCP server B120. The router B102 catches the contents transmission request which is then sent to the camera (terminal A110) via the VPN 116 established between the routers A101 and B102. The L2TP packet 908 contains the source IP address B as the IP header 901, and the session ID 6000 as the L2TP session header 903[W3].

Upon receiving the L2TP packet, the router A101 calls the L2 transfer procedure 212. The L2 transfer procedure 212 proceeds in accordance with the flow shown in FIG. 7-2. More specifically, the router A101 searches the VPN management table 218 from the source IP address B and the session ID 6000 to select VPN ID 1. The router A101 further searches the MAC-VPN mapping table 214 from the VPN ID. The MAC address aaa corresponding to VPN ID 1 matches with the destination MAC address of the ether frame 907 obtained from the L2TP packet 908. Thus the ether frame 907 including the contents transmission request is sent to the terminal A110.

Upon receiving the contents transmission request, the terminal A110 sends the camera picture to the server B113. In this case, the source MAC address of the ether frame 907 including the camera picture is aaa. The sent camera picture is processed by the router A101 in accordance with the flow of the L2 transfer procedure 212 as shown in FIG. 7-1. The router A101 searches the MAC-VPN mapping table 214 and obtains VPN ID 1 corresponding to the source MAC address aaa. Then the router A101 searches the filter entry table 217 corresponding to the VPN ID 1. When the action is Passing, the router A101 searches the VPN management table 218 and obtains the remote IP address B and the remote session ID 4444. The router A101 adds the IP and UDP L2TP headers to the ether frame 907 including the camera picture, which is then sent to the server B113 of the home security company via the VPN 116. The server B113 of the home security company receives the camera picture, analyzes the picture, and then sends the analysis result to the terminal A110. The sending of the analysis result is performed in the same manner as the contents transmission request.

The server C114 of the contents delivery company sends a list of contents that can be delivered, to TV (terminal B111) in the contract user's home. The destination IP address of the list used herein is either a unicast IP address BB, multicast address, or broadcast address that is assigned to the terminal. The router C103 catches the list which is then sent to the TV (terminal B111) via the VPN 117 established between the routers A101 and C103. The L2TP packet 908 contains the source IP address C as the IP header 901, and the session ID 5000 as the L2TP session header 902.

Upon receiving the L2TP packet, the router A101 calls the L2 transfer procedure 212. The L2 transfer procedure 212 proceeds in accordance with the flow shown in FIG. 7-2. More specifically, the router A101 searches the VPN management table 218 from the session ID to select VPN ID 2. The router A101 further searches the MAC-VPN mapping table 214 from the VPN ID. When the list is addressed to the unicast address assigned to the terminal B111, the MAC address bbb corresponding to VPN ID 2 matches with the destination MAC address of the ether frame 907 obtained from the L2TP packet 908. Thus the router A101 sends the ether frame 907 including the list to the terminal B111. When the list is addressed to the broadcast address, the router A101 rewrites the destination MAC address of the ether frame into the MAC address bbb corresponding to VPN ID 2, and then sends the ether frame 907 including the list to the terminal B111.

Upon receiving the list, the terminal B111 displays the list on a display. When the user selects contents from the list, the terminal B111 sends a delivery request to the server C114 of the contents delivery company. In this case, the source MAC address of the ether frame 907 is bbb. The sent delivery request is processed by the router A101 in accordance with the flow of the L2 transfer procedure 212 as shown in FIG. 7-1. More specifically, the router A101 searches the MAC-VPN mapping table 214, and obtains VPN ID 2 corresponding to the source MAC address bbb. The router A101 further searches the filter entry table 217 corresponding to VPN ID 2. When the action is Passing, the router A101 searches the VPN management table 218, and obtains the remote IP address C and the remote session ID 5555. The router A101 adds the IP, UDP, and L2TP headers to the ether frame 907 including the delivery request, which is then sent to the server C114 of the contents delivery company via the VPN 117. The server C114 of the contents delivery company delivers the requested contents to the terminal B111 via the VPN 117. The delivery of the contents is made in the same manner as the list delivery to the unicast address.

The server D115 of the terminal equipment company sends an update notification such as a firm program corresponding to the terminal, to a PC (terminal C112) in the contract user's home. The destination IP address of the program is a unicast IP address CC assigned to the terminal. The router D103 catches the program update notification which is then sent to the PC (terminal C112) via the VPN 118 established between the routers A101 and D104. The L2TP packet 908 contains the source IP address D as the IP heard 901, and the session ID 4000 as the L2TP session header 902.

Upon receiving the L2TP packet, the router A101 calls the L2 transfer procedure 212. The L2 transfer procedure 212 proceeds in accordance with the flow shown in FIG. 7-2. More specifically, the router A101 searches the VPN management table 218 from the session ID to select VPN ID 3. The router A101 further searches the MAC-VPN mapping table 214. The MAC address ccc corresponding to the VPN ID 3 matches with the destination MAC address of the ether frame 907 obtained from the L2TP packet 908. Thus the ether frame 907 including the program update notification is sent to the terminal C112.

Upon receiving the program update notification, the terminal C112 sends the program update request to the server D115 of the terminal equipment company. In this case, the source MAC address of the ether frame 907 is ccc. The sent program update request is processed by the router A101 in accordance with the flow of the L2 transfer procedure 212 as shown in FIG. 7-1. More specifically, the router A101 searches the MAC-VPN mapping table 214, and obtains VPN ID 3 corresponding to the source MAC address ccc. The router A101 further searches the filter entry table 217 corresponding to VPN ID 3. When the action is Passing, the router A101 searches the VPN management table 218 to obtain the remote IP address D and the remote session ID 6666. The router A101 adds the IP, UDP and L2TP headers to the ether frame 907 including the program update request, which is then sent to the server D115 of the terminal equipment company via the VPN 118. Upon receiving the program update request, the server D115 of the terminal equipment company sends a new program to the terminal C112 via the VPN 118. The sending of the new program is performed in the same manner as the program update notification. The PC (terminal C112) receives the new program and then updates the program.

FIG. 5 shows the sequence in which the terminal cuts off the connection to the home network 105 and that the router A101 releases the VPN. The terminal A110 sends a UPnP Device Discovery message: Advertisement: Device unavailable, in order to cut off the connection to the home network 105. Advertisement: Device available is a massage to notify that the own terminal becomes unavailable, using the value SSDP:byebye Upon receiving the UPnP message from the terminal A110, the router A101 calls the UPnP analysis procedure 208. The procedure proceeds from Step 801 to Step 804. The request method 1001 of the message is NOTIFY, so that the procedure proceeds to Step 812 after Step 804. The NTS header 1003 is not ssdp:alive, so that the procedure proceeds to Step 815 after Step 812. The determination of whether it is Device available (Step 815) is made by judging whether the NTS header 1003 is ssdp:byebye. The procedure ends if the NTS header 1003 is not ssdp:byebye. When the NTS header 1003 is ssdp:byebye, the router A101 searches the MAC-VPN mapping table 214 (Step 816), and obtains the SIP URI, IP address, control connection ID, and session ID corresponding to the relevant MAC address (Step 817). Then the router A101 deletes the entry for the VPN from the MAC-VPN mapping table 214 (Step 818), and ends the procedure.

Now returning to FIG. 5, the sequence will be further described. After obtaining the VPN to be deleted in the UPnP analysis procedure 208, the router A101 continues to process the control connection procedure 211 of the L2TP procedure 213. In the control connection procedure 211, the router A101 sends StopCCN (Stop Control Connection Notification) or CDN (Call Disconnect Notify) to release the VPN. More specifically, the router A101 sends CDN when another valid L2TP session is established between the routers A101 and B102, or sends StopCCN with no session established therebetween. Thus the L2TP control connection is released by the above described sequence.

After releasing the VPN, the router A101 continues to process the SIP procedure 210. In the SIP procedure 210, the router A101 sends a session release request (BYE message) to the SIP server 119 by using the SIP URI obtained in Step 615. The SIP server 119 receives the BYE message and transfers the BYE message to the router B102. Upon receiving the BYE message, the router B102 sends the 200 OK message to the SIP server 119 and releases the SIP session. The SIP server 119 transfers the 200 OK message to the router A101. Thus the SIP session is released by the above described sequence.

In this way, it is possible that the router A101 resolves the SIP URI of the appropriate VPN for the terminal from the user information and the terminal information to establish the VPN for the service provider corresponding to the terminal. It is further possible to filter traffic to the appropriate VPN for each terminal by using the MAC-VPN mapping table created through the VPN establishment process.

Second Embodiment

Figure 13:
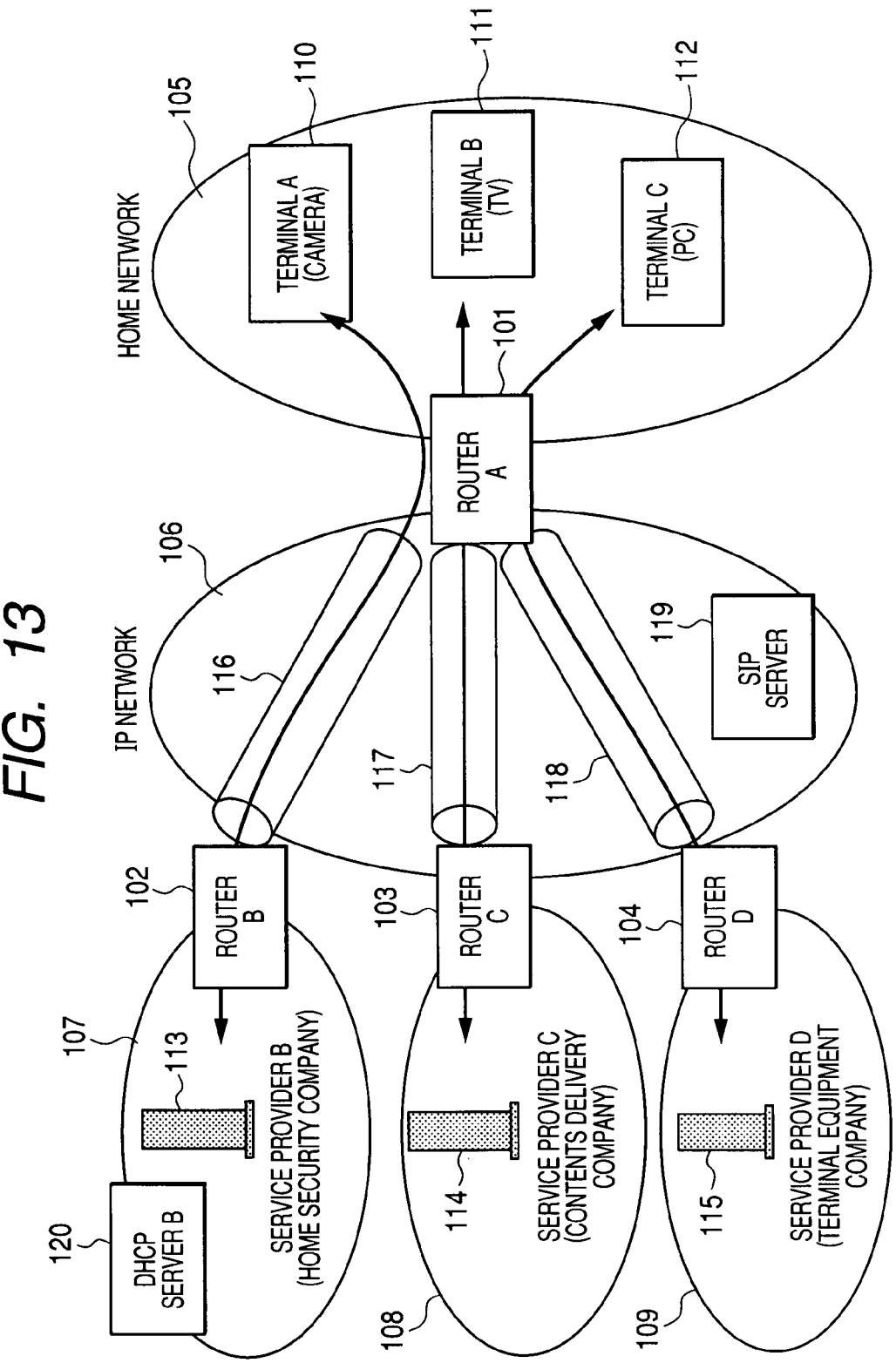
FIG. 13 is a conceptual diagram[W2] showing a communication system in which the invention is carried out when a management server does not exist.

In Second Embodiment, the description will be given with respect to an example in which the router A101 automatically creates a SIP URI when the management server 121 does not exist. FIG. 13 shows a communication system in which the present invention is carried out. The communication system includes: routers A101, B102, C103, D104; a home network 105 to which the router A belongs; an IP network 106; networks (107, 108, 109) of service providers to which the routers B to D belong respectively; terminals A110, B111, C112 belonging to the home network; servers (113, 114, 115) of the service providers; a SIP server 119; and a DHCP server 120 of service provider B. The routers A and B are connected by a VPN 116, the routers A and C are connected by a VPN 117, and the routers A and D are connected by a VPN 118.

Figure 14:
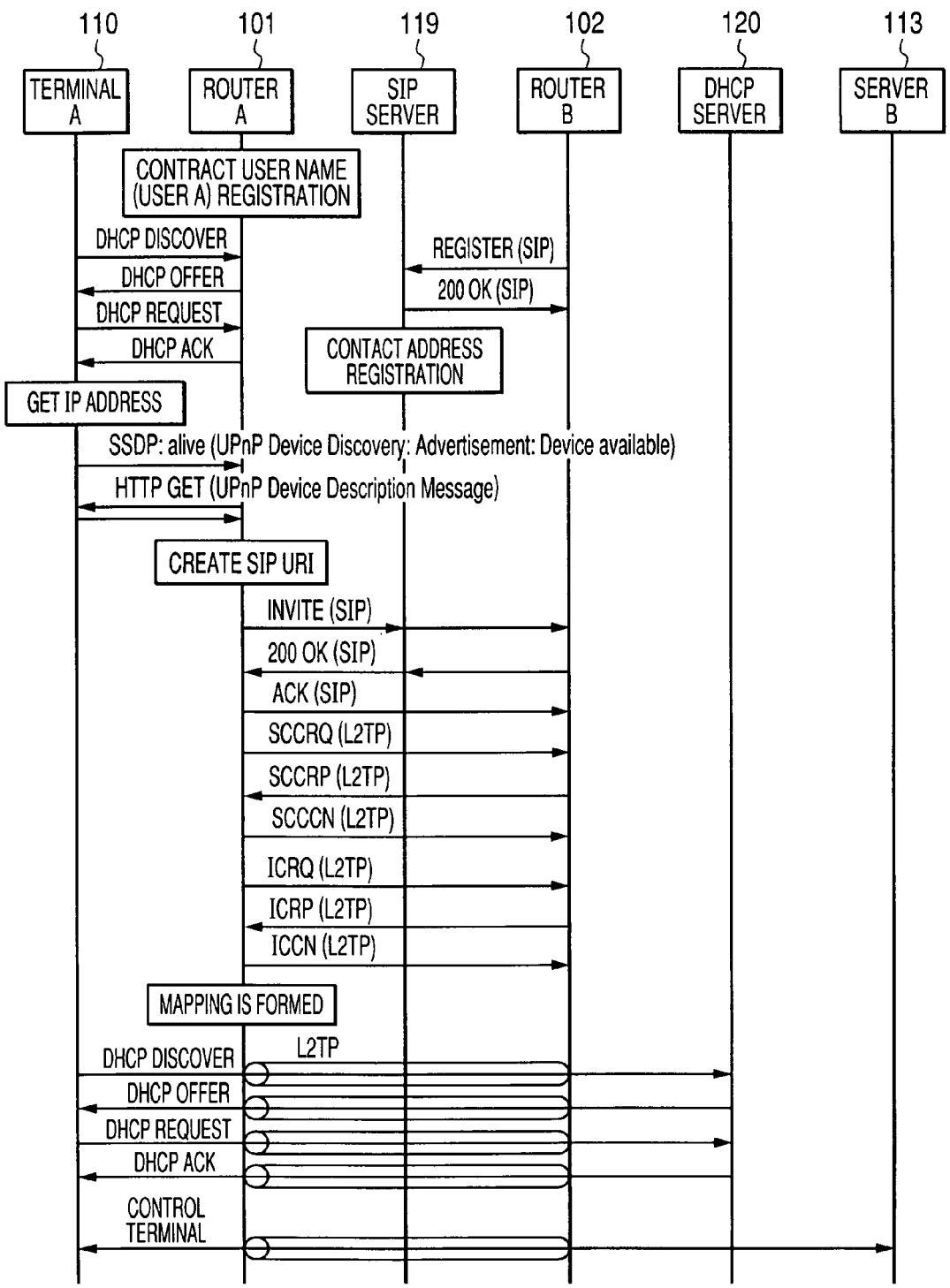
FIG. 14 is a sequence diagram showing the manner in which the invention is carried out when the management server does not exist.

FIG. 14 shows the sequence in which the present invention is carried out. A user of the home network 105 registers contract information such as the user name (USER A) having a contract with a service provider or a platform provider into the router A101 in advance. The registered information is managed in the user information table 216 of the router A101. The router B102 registers the SIP URI of VPN to provide a service and the IP address corresponding to the SIP URI into the SIP server 119 by using a REGISTER message. The SIP URI is registered in accordance with a SIP URI creation rule table 1102. FIG. 11-3 shows a configuration example of the SIP URI creation rule table. The SIP URI creation rule table manages the information elements constituting the SIP URI and the creation rule of the SIP URI created from the information elements. Further, the router A101 of the user who uses the service and the router B102 of the service provider who provides the service maintain the same SIP URI creation rule table 1102. In the embodiment, assuming that the contract user name is USER A, the product name of the terminal A to which the service is provided is AA-100, and the maker is HITACH, the router B102 registers ServiceVPN@UserA.AA-100.HITACHI.co.jp, in accordance with the SIP URI creation rule table, together with a Contact address. The registered Contact address is B which is the IP address of the router B102.

The terminal A110 within the home network 105 obtains an IP address a from the router A101 in the same manner as in First Embodiment. The terminal A110 sends the UPnP Device Discovery message: Advertisement: Device available, using the IP address a obtained from the router A101 similarly to First Embodiment.

Figure 15:
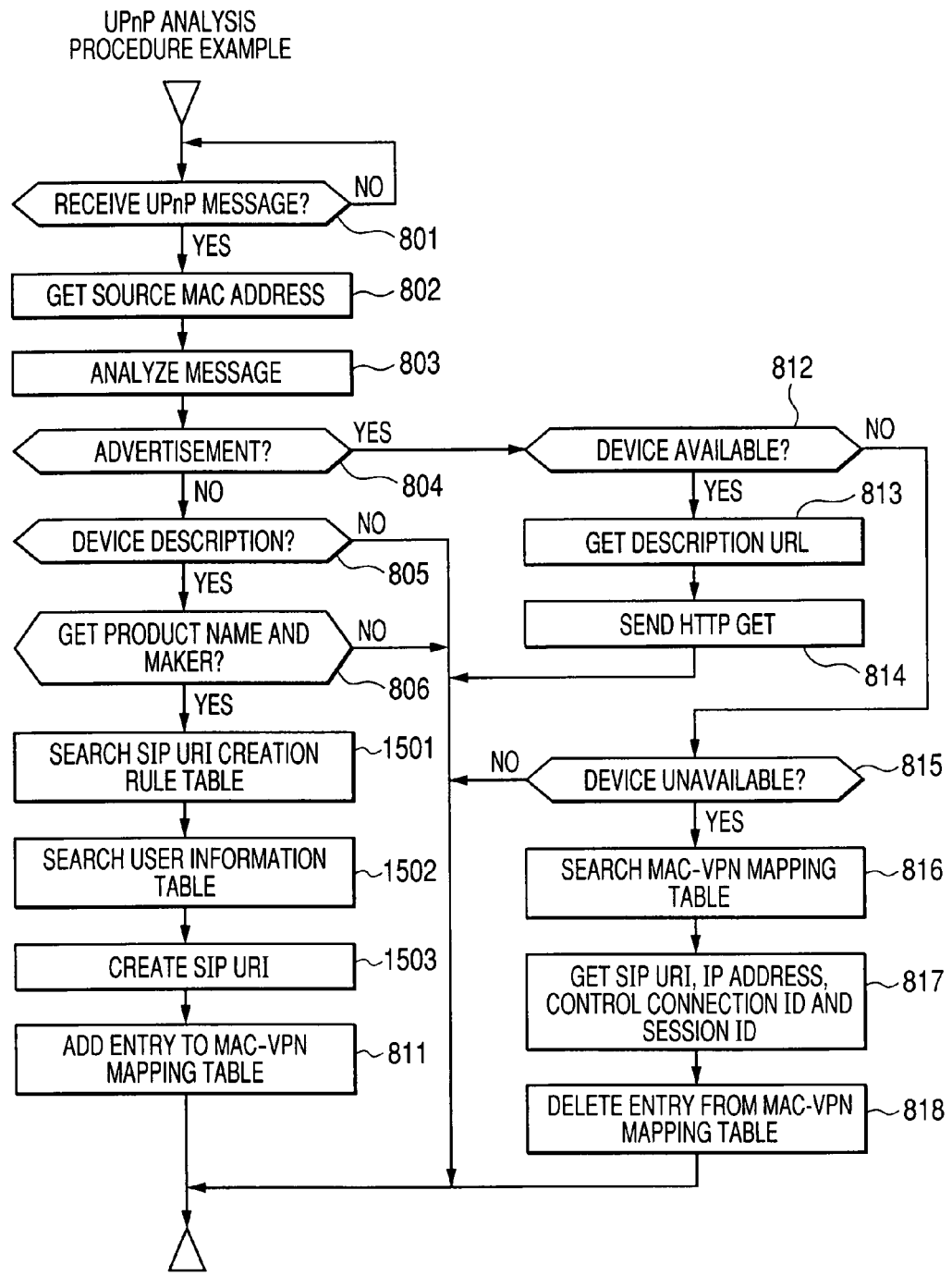
FIG. 15 is a flowchart showing a UPnP procedure when the management server does not exist.

Upon receiving the UPnP from the terminal A110, the router A101 calls the UPnP analysis procedure 208. FIG. 15 shows a process flow of the UPnP analysis procedure 208 in the embodiment. The received UPnP message is Advertisement: Device available, so that the procedure proceeds from Step 801 to Step 804 and from Step 812 to Step 814 to send an HTTP GET request to the terminal A110, and then the procedure ends.

Now returning to FIG. 14, the sequence will be further described. The terminal A110 receives the HTTP GET request, and then sends the UPnP Device Description message to the router A101, together with a response code of 200 OK. Upon receiving the UPnP message, the router A101 calls the UPnP analysis procedure 208. The message is the UPnP Device Description message, so that the procedure proceeds from Step 801 to Step 806 to obtain the terminal information, such as the maker (HITACHI) and the product name (AA-100) of the terminal A110, respectively from a manufacture header 1005 and model Name header 1006 included in the Device Description message. The information of the manufacture header 1005 and modelName header 1006 is necessary for the UPnP Device Description message, and the procedure ends if there is no description.

After obtaining the terminal information, the router A101 searches the SIP URI creation rule table 1102 (Step 1501), and defines the information elements necessary to create the SIP URI. In the embodiment, the contract user name, the product name, and the maker are necessary. Thus the router A101 searches the user information table 217 to obtain the contract user information (Step 1502). The router A101 creates the SIP URI (ServiceVPN@UserA.AA-100.HITACHI.co.jp) in accordance with the SIP URI creation rule, by using the product name and maker obtained in Step 806 as well as the contract user name obtained in Step 1502 (Step 1503). The router A101 sets the MAC address aaa obtained in Step 802 and the SIP URI created in Step 1503 into the MAC-VPN mapping table 213 (Step 811), and ends the procedure.

By the above described procedure, the router A101 creates the SIP URI of VPN to which the terminal is connected. The following process is the same as in First Embodiment. In this way, it is possible that even if the management server 121 does not exist, the router A101 automatically creates the SIP URI to establish the VPN for the service provider corresponding to the terminal. It is further possible to filter traffic to the appropriate VPN for each terminal by using the MAC-VPN mapping created through the VPN establishment process.

Third Embodiment

In Third Embodiment, the description will be given with respect to an example in which the terminal within the home network notifies about the SIP URI of the VPN to be connected. The communication system and sequence in which the invention is carried out are the same as those in Embodiment 2.

The router B102 registers, using the REGISTER message, the same SIP URI as the SIP URI notified by the terminal A110 of the user to whom the service is provided, as well as the IP address corresponding to the SIP URI into the SIP server 119. In the embodiment, the router B102 registers the SIP URI as serviceVPN@AA-100.HITACHI.co.jp and the Contact address as B which is the IP address of the router B102 by using the REGISTER message.

The terminal A110 within the home network 105 obtains the IP address a from the router A 101 in the same manner as in First and Second Embodiments. Similarly to First Embodiment, the terminal A110 sends the UPnP Device Discovery message: Advertisement: Device available by using the IP address a obtained from the router A101.

The router A101 receives the UPnP message from the terminal A110, and calls the UPnP analysis procedure 208. FIG. 16 shows a process flow of the UPnP analysis procedure 208 in the embodiment. The received UPnP message is Advertisement: Device available, so that the procedure proceeds from Step 801 to Step 804 and from Step 812 to Step 814 to send the HTTP GET request to the terminal A110, and then the procedure ends.

Now returning to FIG. 14, the sequence will be further described. Upon receiving the HTTP GET request, the terminal A110 sends the UPnP Device Description message to the router A101, together with the response code of 200 OK. Upon receiving the UPnP message, the router A101 calls the UPnP analysis procedure 208. The message is the UPnP Device Description message, so that the procedure proceeds from Step 801 to Step 805 to obtain the Device Description message sent by the terminal A110. FIG. 17 shows a description example of the Device Description message. There is provided a Service VPN header 1701 in which the SIP URI of the VPN to be connected to the terminal A110 is described, in addition to the normal Device Description message. In the UPnP analysis procedure 208, the router A101 obtains the SIP URI of VPN to be connected to the terminal, which was notified by the Device Description message in Step 1601. The router A101 sets the MAC address obtained in Step 802 as well as the SIP URI obtained in Step 1601 into the MAC-VPN mapping table 214 (Step 811), and ends the procedure.

By the above described procedure, the router A101 obtains the SIP URI of VPN to be connected to the terminal. The following process is the same as in First and Second Embodiments. In this way, when the own terminal notifies about the SIP URI of VPN to provide the service, it is possible to establish the VPN for the service provider corresponding to the terminal by using the notified SIP URI. It is further possible to filter traffic to the appropriate VPN for each terminal by using the MAC-VPN mapping table created through the VPN establishment process.

Fourth Embodiment

In Fourth Embodiment, the description will be given with respect to an example in which the router A101 allocates a terminal not supporting UPnP to an appropriate VPN, or does not use UPnP. The communication system in which the invention is carried out is the same as in Second Embodiment.

Figure 18:
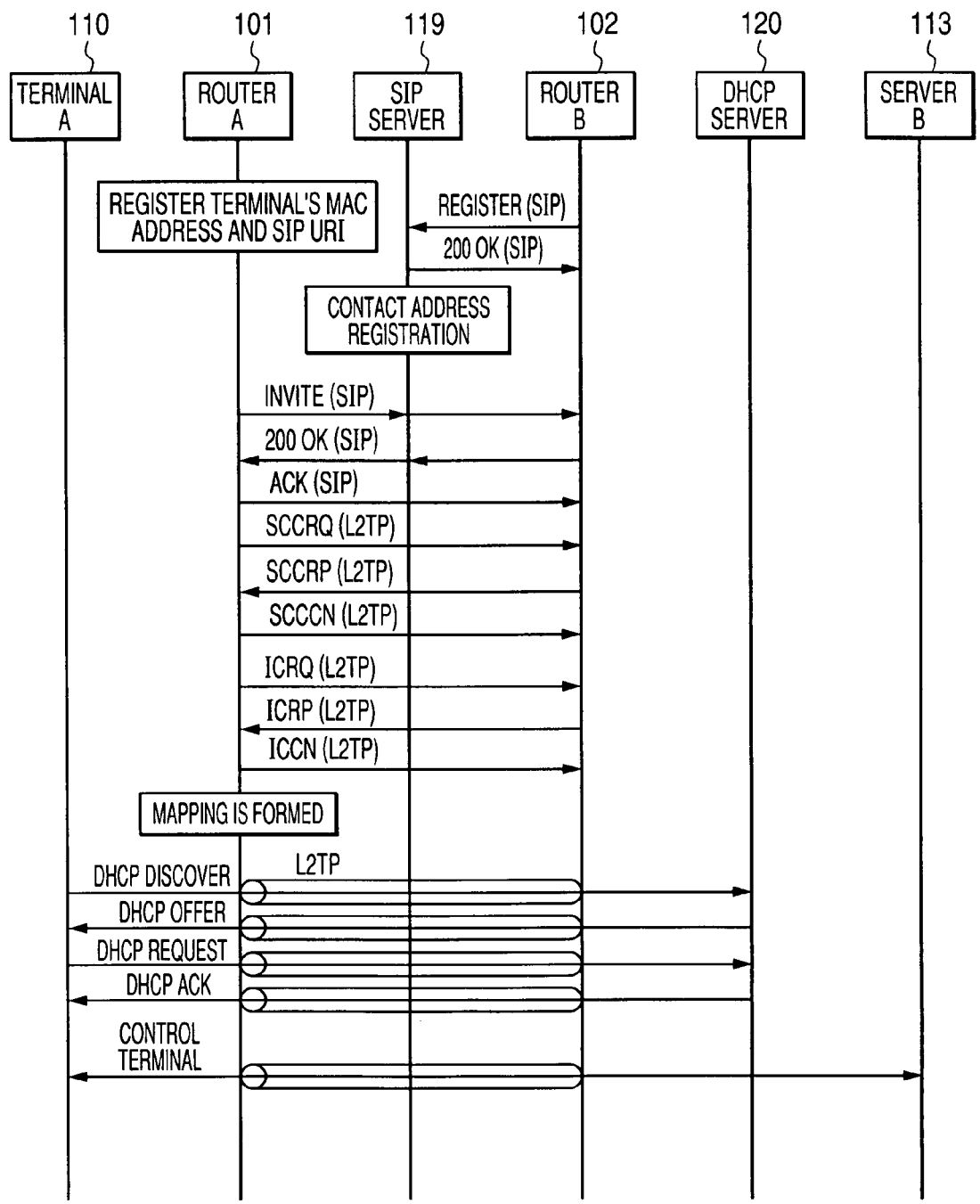
FIG. 18 is a sequence diagram showing the manner in which the invention is carried out in a terminal not supporting UPnP.

FIG. 18 shows the sequence in which the invention is carried out. In the MAC-VPN mapping table 214 of the router A101, there have been registered, of the terminals connected to the home network 105, the MAC address of the terminal necessary to be connected to the service provider network, in addition to the SIP URI. In the case of the communication system of FIG. 1, the MAC addresses of the terminals A110, B111, C112, and the SIP URIs are registered. It is assumed that each service provider notified the service user about the SIP URI in writing or through other means in advance. The routers B, C, D of the service provides B, C, D register the SIP URIs of VPN provided by each of the service providers as well as the IP addresses corresponding to the SIP URIs, into the SIP server 119 by using the REGISTER message.

After registration of the MAC addresses and the SIP URIs, the router A101 calls the SIP procedure 210. The SIP procedure 210 establishes SIP sessions based on the SIP URIs registered in the MAC-VPN mapping table 214. The following process is the same as in First Embodiment.

In this way, the router A101 can establish the VPN for the service provider corresponding to the terminal, even if the terminal does not support the UPnP. It is further possible to filter traffic to the appropriate VPN for each terminal by using the MAC-VPN mapping table created through the VPN establishment process.

Fifth Embodiment

In Fifth Embodiment, the description will be given with respect to an example in which when UPnP is not supported or not used, the router A101 resolves the SIP URI of the terminal by using the management server 121 to filter traffic to the appropriate VPN for the terminal. The communication system in which the invention is carried out is the same as in First Embodiment.

Figure 19:
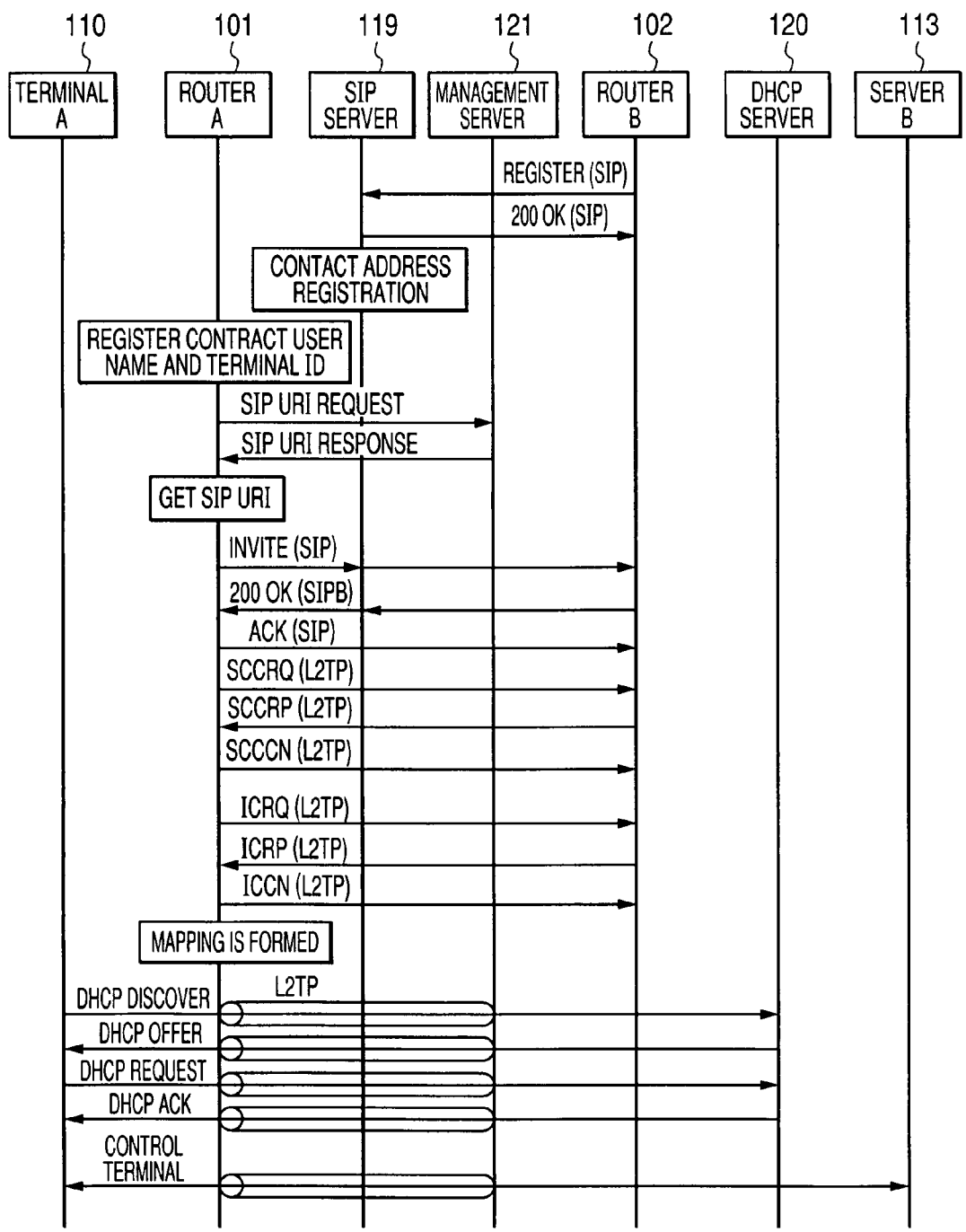
FIG. 19 is a sequence diagram showing the manner in which the invention is carried out using the management server and the terminal not supporting UPnP.

FIG. 19 shows the sequence in which the invention is carried out.

The management server 121 manages the SIP URI management table 1101. The SIP URI management table is a table for managing the SIP URI corresponding to the contract user information and terminal information.

The service provider router B102 registers the same SIP URI as the SIP URI notified by the terminal A110 of the user to whom the service is provided as well as the IP address B corresponding to the SIP URI, into the SIP server 119 by using the REGISTER message. In the router A of the home network 105, there has been registered the contract user information and the terminal information (MAC address of the terminal, product number, maker). The contract user information is registered into the user information table 216 and the terminal information is registered into the terminal information management table 1104 of the router A101. FIG. 11-4 shows a configuration example of the terminal information management table. The terminal information management table 1104 is a table for mapping the terminal with the MAC address of the terminal. Here, instead of the product number and the maker, other values may be used such as UPnP:UUID and a value uniquely assigned by the maker or service provider, as long as the terminal is identified by the values.

After registration of the contract user information and the information on the terminal within the home network 105, the router A101 sends the SIP URI request to the management server 121. The SIP URI request includes at least the terminal information (product number, maker) and contract user information that are related to the SIP URI of VPN that the router A101 wishes to resolve. When the SIP URI is not uniquely defined by only the terminal information, there may be included additional information such as the ID of the service user, the maker of the terminal, and the service provider. Upon receiving the SIP URI request, the management server 121 searches the SIP URI management table 1101 to identify the requested SIP URI corresponding to the user and terminal information, and then notifies the router A101 about the identified SIP URI as the SIP URI response. The router A101 registers the notified SIP URI and the MAC address corresponding to the terminal having requested the SIP URI into the MAC-VPN management table 214. After registration of the MAC address and the SIP URI, the router A101 calls the SIP procedure 210. The SIP procedure 210 establishes the SIP session based on the SIP URI registered in the MAC-VPN mapping table 214. The following process is the same as in First Embodiment.

In this way, even if the terminal does not support UPnP, the router A101 can establish the appropriate VPN for the service provider corresponding to the terminal, without any need for the service user to register the SIP URI into the router A101. It is further possible to filter traffic to the appropriate VPN for each terminal by using the MAC-VPN mapping table created through the VPN establishment process.

What is claimed is:

1. Communication equipment connected to a terminal and other communication equipment and a management server, comprising:
    a first interface connected to the other communication equipment via a VPN;
    a second interface connected to the terminal;
    a memory for storing a mapping relationship between a MAC address of the terminal and VPN information that identifies the VPN; and
    a controller for determining a destination VPN of data to be sent by the terminal, based on the mapping relationship,
    wherein the communication equipment sends a product information included in the received packet from the terminal to the management server, obtains a SIP URI for establishing the VPN corresponding to the product information from the management server and obtains the VPN information based on the SIP URI.

2. The communication equipment according to claim 1, further comprising automatically creating the mapping relationship based on information received from the terminal.

3. The communication equipment according to claim 1, wherein the mapping relationship is received from the terminal.

4. The communication equipment according to claim 3, wherein the mapping relationship is received from the terminal by using a UPnP Device Description message.

5. The communication equipment according to claim 1, further comprising an input interface for receiving an input of the mapping relationship from the outside.

6. The communication equipment according to claim 1, wherein the terminal interface information is a MAC address of the terminal.

7. The communication equipment according to claim 1, wherein the VPN information is a control connection ID and a session ID of an L2TP.

8. The communication equipment according to claim 1, further comprising maintaining filtering information of the VPN that is created based on the mapping relationship,
    thereby determining whether to abandon or pass the data sent and received by the terminal based on the filtering information.

9. The communication equipment according to claim 1, wherein
    the communication equipment is connected to the plurality of terminals and connected to the plurality of other communication equipment, and is connected to the plurality of other communication equipment via a plurality of VPNs,
    wherein mapping relationships between the plurality of terminals and the plurality of communication equipment are stored in the memory, and
    wherein the communication equipment further maintains filtering information for each of the VPNs that are created based on the mapping relationships,
    thereby determining whether to abandon or pass the data sent and received between any of the plurality of terminals and any of the plurality of other communication equipment via any of the plurality of VPNs, based on the filtering information.

* * * * *